US009325749B2

(12) United States Patent
Bangor et al.

(10) Patent No.: US 9,325,749 B2
(45) Date of Patent: Apr. 26, 2016

(54) METHODS AND APPARATUS TO MANAGE CONFERENCE CALL ACTIVITY WITH INTERNET PROTOCOL (IP) NETWORKS

(75) Inventors: Aaron Bangor, Austin, TX (US); Jeffrey Brandt, Cedar Park, TX (US); Douglas F. Reynolds, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1537 days.

(21) Appl. No.: 11/669,656

(22) Filed: Jan. 31, 2007

(65) Prior Publication Data

US 2008/0181140 A1    Jul. 31, 2008

(51) Int. Cl.
| | |
|---|---|
| *H04L 12/56* | (2006.01) |
| *G10L 15/00* | (2013.01) |
| *G10L 17/00* | (2013.01) |
| *G10L 13/00* | (2006.01) |
| *H04L 29/06* | (2006.01) |
| *H04L 12/18* | (2006.01) |

(52) U.S. Cl.
CPC .......... *H04L 65/403* (2013.01); *H04L 12/1818* (2013.01)

(58) Field of Classification Search
CPC ............ H04L 65/403; H04M 2201/40; H04M 2203/5018; H04M 3/42102; H04M 3/53383
See application file for complete search history.

(56) References Cited

U.S. PATENT DOCUMENTS

| | | | |
|---|---|---|---|
| 5,184,345 A | 2/1993 | Sahni | |
| 5,195,086 A | 3/1993 | Baumgartner et al. | |
| 5,436,957 A | 7/1995 | McConnell | |
| 5,454,033 A | 9/1995 | Hahn et al. | |
| 5,689,641 A | 11/1997 | Ludwig et al. | |
| 5,806,032 A | 9/1998 | Sproat | |
| 5,936,744 A | 8/1999 | Choi | |
| 6,256,116 B1 | 7/2001 | Nawrocki | |
| 6,452,924 B1 * | 9/2002 | Golden et al. | 370/352 |
| 6,560,323 B2 | 5/2003 | Gainsboro | |
| 6,668,044 B1 | 12/2003 | Schwartz et al. | |
| 6,697,614 B2 | 2/2004 | Dorenbosch | |
| 6,721,059 B1 | 4/2004 | Sturgeon et al. | |
| 6,810,116 B1 | 10/2004 | Sorensen et al. | |

(Continued)

FOREIGN PATENT DOCUMENTS

| | | |
|---|---|---|
| JP | 2001119405 | 4/2001 |
| WO | PCT/US03/04042 | 8/2003 |

(Continued)

OTHER PUBLICATIONS

Atlanta Business Chronicle, "Secretaries may be obsolete as high-tech assistants debut," Jul. 15, 1996, 3 pages.

(Continued)

*Primary Examiner* — Asad Nawaz
*Assistant Examiner* — Jason Harley
(74) *Attorney, Agent, or Firm* — Hanley, Flight & Zimmerman, LLC

(57) ABSTRACT

Methods and apparatus to monitor conference call activity with Internet protocol (IP) networks are disclosed. An example method comprises monitoring a network for a first conference call participant connection request, prompting the first conference call participant for authentication credentials, and when the first conference call participant is authorized based on the credentials, associating an Internet protocol (IP) address with the first conference call participant for use in place of the authentication credentials.

15 Claims, 11 Drawing Sheets

(56) References Cited

U.S. PATENT DOCUMENTS

| | | |
|---|---|---|
| 6,820,055 B2 | 11/2004 | Saindon et al. |
| 6,839,417 B2 | 1/2005 | Weisman et al. |
| 6,850,609 B1 | 2/2005 | Schrage |
| 6,853,716 B1 | 2/2005 | Shaffer et al. |
| 6,865,264 B2 | 3/2005 | Berstis |
| 6,879,671 B2 | 4/2005 | Schmid et al. |
| 6,931,113 B2 | 8/2005 | Ortel |
| 6,961,857 B1 | 11/2005 | Floryanzia |
| 7,006,616 B1 | 2/2006 | Christofferson et al. |
| 7,035,387 B2 | 4/2006 | Russell et al. |
| 7,039,395 B2 | 5/2006 | Kundaje et al. |
| 7,043,001 B2 | 5/2006 | Moisey et al. |
| 7,113,580 B1 | 9/2006 | DellaMorte, Sr. et al. |
| 7,466,334 B1 | 12/2008 | Baba |
| 2002/0078153 A1* | 6/2002 | Chung .................. G06Q 10/10 709/204 |
| 2002/0083462 A1 | 6/2002 | Arnott |
| 2002/0085700 A1 | 7/2002 | Metcalf |
| 2002/0161579 A1 | 10/2002 | Saindon et al. |
| 2003/0040917 A1 | 2/2003 | Fiedler |
| 2003/0072429 A1 | 4/2003 | Slobodin et al. |
| 2003/0088619 A1 | 5/2003 | Boundy |
| 2003/0125954 A1* | 7/2003 | Bradley ............ H04M 3/42042 704/270 |
| 2003/0140121 A1 | 7/2003 | Adams |
| 2003/0223562 A1 | 12/2003 | Cui et al. |
| 2004/0052218 A1 | 3/2004 | Knappe |
| 2004/0086101 A1 | 5/2004 | Katz |
| 2004/0186712 A1 | 9/2004 | Coles et al. |
| 2004/0207884 A1 | 10/2004 | Chen |
| 2005/0012966 A1 | 1/2005 | Mitchell et al. |
| 2005/0021344 A1 | 1/2005 | Davis et al. |
| 2005/0074008 A1 | 4/2005 | Herledan et al. |
| 2005/0152524 A1 | 7/2005 | Carlson et al. |
| 2005/0175160 A1* | 8/2005 | Simpson et al. ........... 379/88.13 |
| 2005/0185777 A1 | 8/2005 | Russell et al. |
| 2006/0074658 A1* | 4/2006 | Chadha ........................ 704/246 |
| 2006/0133354 A1 | 6/2006 | Lee |
| 2006/0165068 A1 | 7/2006 | Dalton et al. |
| 2006/0285535 A1* | 12/2006 | Metcalf ............. H04L 29/06027 370/352 |
| 2007/0058795 A1 | 3/2007 | Arrant et al. |
| 2007/0071206 A1* | 3/2007 | Gainsboro et al. ............ 379/168 |
| 2007/0172047 A1 | 7/2007 | Coughlan et al. |

FOREIGN PATENT DOCUMENTS

| | | |
|---|---|---|
| WO | WO03071774 | 8/2003 |
| WO | PCT/EP2004/051575 | 2/2005 |
| WO | WO2005013596 | 2/2005 |

OTHER PUBLICATIONS

Speech Technology Magazine, "Virtual Assistants: Speech's next Killer App," Dec./Jan. 1999, 5 pages.

www.ccdemo.com; "How Integrated do You Want to be Today?" Jan. 1, 2000, 5 pages.

Amarex Technology, Inc., "VSP Products," Copyright 1999, 4 pages.

Steve Silberstang, "Building a Reliable Intelligent Peripheral/Service Node" Copyright 1999, 14 pages.

www.ccdemo.com; "How Integrated do You Want to be Today?" Jan. 1, 2000, (5 pages).

Speech Technology Magazine, "Virtual Assistants: Speech's next Killer App," Dec./Jan. 1999, (5 pages).

Atlanta Business Chronicle, "Secretaries may be obsolete as high-tech assistants debut," Jul. 15, 1996, (3 pages).

Amarex Technology, Inc., VSP Products, Copyright 1999, (4 pages).

Steve Silberstang, "Building a Reliable Intelligent Peripheral/Service Node," Copyright 1999, (14 pages).

* cited by examiner

700 ↘

| | IP ADDRESS (705) | AUTHORIZATION (710) |
|---|---|---|
| 715 → | 192.168.254.32 | Listen |
| 720 → | 192.168.254.17 | Full |
| 725 → | 209.191.93.52 | Voice command subgroup A |
| 730 → | 72.14.205.104 | Voice command subgroup B |

FIG. 7

METHODS AND APPARATUS TO MANAGE CONFERENCE CALL ACTIVITY WITH INTERNET PROTOCOL (IP) NETWORKS

FIELD OF THE DISCLOSURE

This disclosure relates generally to telecommunications and, more particularly, to methods and apparatus to manage conference call activity with Internet protocol (IP) networks.

BACKGROUND

Meeting organizers, project leaders, and/or business managers (hereafter "meeting facilitators") frequently need to communicate with employees, consultants, and/or vendors involved in various projects. Projects and/or sub-tasks associated with projects may include the efforts and/or cooperation of employees, consultants, and/or vendors located within geographically separated parts of one or more organizations (e.g., company, business, not-for-profit organization, etc.). As a result, conference calls are a particularly useful management tool for meeting facilitators.

At the beginning of a conference call, participants typically call a telephone number and verbally introduce themselves to the other participants already engaged in the conference call. As the number of participants increases, the existing participants must strive to remember a large number of voices and their associated names. Additionally, those participants that call in to the conference late (e.g., after initial introductions have been completed) may not have the opportunity to hear participant introductions. Thus, they may not recognize who is speaking during subsequent times of the conference call. As a result, it may be necessary to interrupt the conference call meeting and interject various questions about who was (just) speaking.

The conference call allows the meeting facilitator and other project members to discuss project plans, project issues, and/or assign additional project tasks designed to accomplish various project objectives. Particular participants that are assigned action items (e.g., project tasks and/or sub-tasks) may verbally acknowledge acceptance of the task(s), communicate task objectives and deliverables, and/or communicate task start and/or end dates for which the task should be completed. In such circumstances, the meeting facilitator or another participant maintains the burden of taking meeting notes and documenting which conference call participants are responsible for the various assigned tasks. This burden is particularly difficult when the number of participants is high. Such administrative tasks may distract the meeting facilitator and/or other note-taking participants from applying his or her talents to project problem solving and/or other expertise. Such tasks may also consume meeting time.

BRIEF DESCRIPTION OF THE DRAWINGS

FIG. 7 is an example portion of a table to track internet protocol addresses for the system of FIG. 1.

DETAILED DESCRIPTION

Methods and apparatus to monitor conference call activity with Internet protocol (IP) networks are disclosed. An example method comprises monitoring a network for a first conference call participant connection request, prompting the first conference call participant for authentication credentials, and when the first conference call participant is authorized based on the credentials, associating an Internet protocol (IP) address with the first conference call participant for use in place of the authentication credentials.

Figure 1:
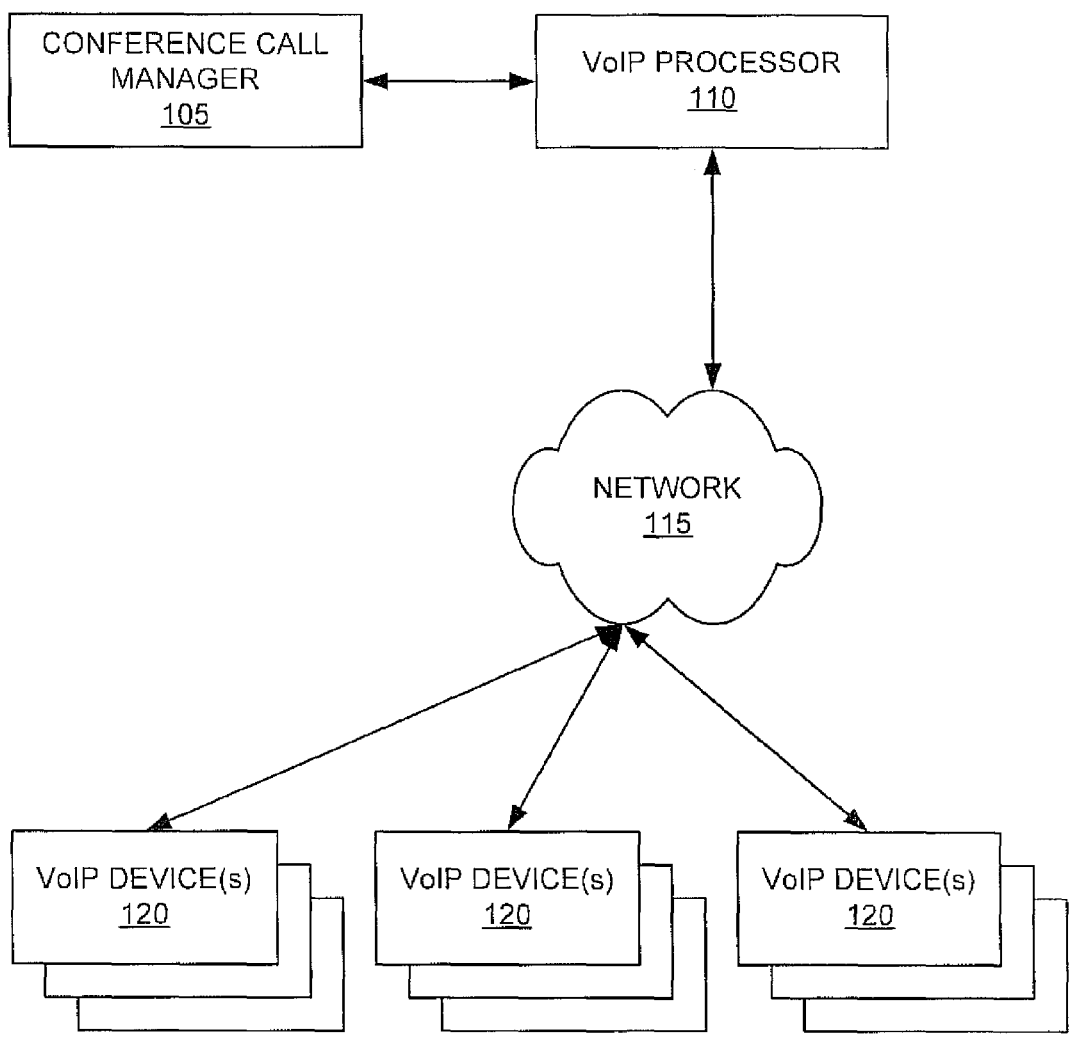
FIG. 1 is a schematic diagram illustrating an example system to manage conference call activity with voice over Internet protocol (VoIP) networks constructed in accordance with the teachings of the invention.

FIG. 1 is a schematic illustration of an example VoIP communication system 100 to manage conference call activity. More specifically, the example system 100 includes a conference call manager 105, a voice over Internet protocol (VoIP) processor 110, and one or more VoIP-enabled devices 120 communicating via a network 115, such as an intranet and/or the Internet. Persons having ordinary skill in the art will appreciate that the network 115 may be referred to as an internet protocol (IP) network regardless of whether the network 115 is communicatively connected to the Internet. In the illustrated example system 100 of FIG. 1, a user (e.g., a conference call participant) employs one of the VoIP-enabled devices 120 to dial a call-in telephone number to participate in a conference call. The call-in number may be dialed by all users and is, thus, referred to as a "conference call telephone number" or, "call-in telephone number" or more succinctly, a "common telephone number." The VoIP processor 110, discussed in further detail below, facilitates communication from the VoIP-enabled devices, over the IP network 115, and to the conference call manager 105. The conference call manager 105 may be assigned the common telephone number and include a conference bridge to permit the users of the VoIP-enabled devices 120 at the same and/or diverse locations to be connected together. The conference call manager 105 may be located at a company associated with one or more of the conference call participants, and/or may be located at a third party conference call service provider, such as AT&T.

As discussed in further detail below, the example conference call manager 105 authenticates one or more conference call participants and allows them to issue voice commands. The voice commands aid conference call efficiency by automating certain tasks, such as, for example, assigning one or more participants as owners of a meeting task, scheduling status delivery dates, and/or scheduling future meetings. A meeting facilitator may view a complete list of voice commands via a graphical user interface (GUI) (e.g., a web-based GUI), and/or edit, delete, and/or otherwise modify the functionality of the example voice commands via the GUI.

Figure 2:
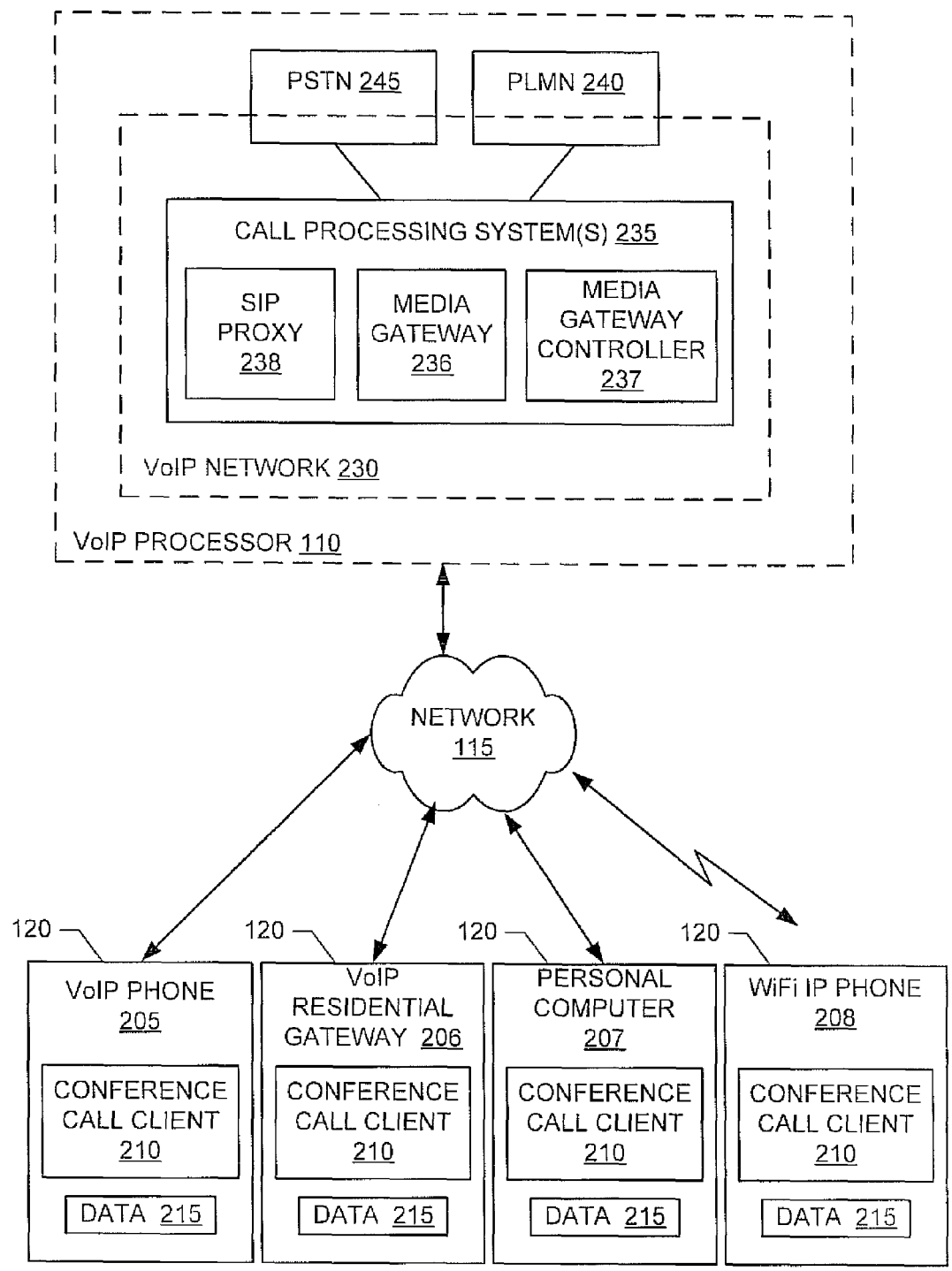
FIG. 2 is a more detailed schematic diagram of the example VoIP processor and the example VoIP devices of the system of FIG. 1.

FIG. 2 illustrates the example VoIP processor 110 and VoIP-enabled devices 120 of FIG. 1 in greater detail. Throughout the following disclosure, the example VoIP processor 110, the network 115, and the example VoIP-enabled devices will be referred to collectively as the VoIP communication system. Also in the interest of brevity and clarity, throughout the following disclosure references will be made to the example VoIP communication system, VoIP networks, VoIP devices, service entities and/or VoIP services of FIG. 2. However, it should be understood that the methods and apparatus to manage conference call activity with VoIP networks disclosed herein are applicable to other types of communication services, networks, technologies and/or systems such as public switched telephone network (PSTN) systems, wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or combinations and/or hybrids of these devices, systems and/or networks with or apart from an IP network.

Further, while disclosed examples discussed herein utilize session initiation protocol (SIP) exchanges, messages and/or techniques to initiate, establish and/or modify VoIP communication sessions and/or data transfer sessions, any number and/or type(s) of communication protocol(s), message(s), exchange(s) and/or technique(s) for initiating, establishing and/or modifying communication sessions and/or data transfer sessions may be utilized. For example, any past, current and/or future media gateway control protocol (MGCP) standard and/or specification, such as the International Telecommunication Union (ITU) H.24S standard may be employed.

To allow users to, for example, place and/or receive a VoIP based communication (e.g., a telephone service, Internet service, data service, messaging service, instant messaging service, electronic mail (e-mail) service, chat service, video service, audio service, gaming service, etc.), the example communication system of FIG. 2 includes one or more VoIP-enabled devices 120, four of which are illustrated in FIG. 2 with reference numerals 205, 206, 207 and 208. The example VoIP devices 205, 206, 207 and 208 of FIG. 2 maybe any type(s) of VoIP-enabled devices including, for example, a corded and/or cordless VoIP phone 205, a VoIP residential gateway 206, a VoIP enabled personal computer 207, a VoIP endpoint, a wireless VoIP device 205 (e.g., a wireless-fidelity (WiFi) Internet protocol (IP) phone), and/or a VoIP adapter (e.g., an analog telephone adapter (ATA)). An example manner of implementing any or all of the example VoIP devices 205, 206, 207 and 208 of FIG. 2 is described below in connection with FIG. 3.

As illustrated in FIG. 2, each of the example VoIP-enabled devices 205, 206, 207, and 208 includes a conference call client 210. The example VoIP-enabled devices 205, 206, 207, and 208 are configured to establish one or more communication sessions using, for example, Internet protocol (IP) based communication, universal datagram protocol (UDP) based communication, transmission control protocol (TCP) based communication, TCP/IP based communication, file transfer protocol (FTP) communication, and/or hyper-text markup language (HTML) based communication. Example data that may be exchanged and/or transmitted via a data transfer session includes, but is not limited to, digital pictures, audio, video, data files, advertisements, coupons, website information, etc. Data transfer sessions may also be used to send and/or exchange any number and/or type(s) of account information and/or user validation information 215 (e.g., a password, a personal identification number (PIN), an account number, a user name, an account name, a government identification number, a social security number, a credit card number, an address, an authorization code, a conference call participant identification number, and/or a phone number). In some examples, data transfer sessions and/or data transmitted via a data transfer session may be encrypted for security. The example data 215 of FIG. 2 may be stored in VoIP-enabled devices 205-208 using any number and/or type(s) of data structures such as, for example, a so called Internet "cookie." Although the various instances of "data" in FIG. 2 are labeled with the same reference numeral 215, those data instances are typically not the same, but are instead specific to the VoIP devices 120 in which they reside.

The example conference call client 210 of the VoIP-enabled devices 205-208 establishes participation in conference call activity conducted by the conference call manager 105 of FIG. 1. Conference call communication session(s) maybe initiated and/or established during and/or after the establishment of a VoIP communication session, and as directed and/or initiated by a user of a VoIP-enabled device 205-208. For example, a user may join a conference call from the VoIP-enabled device 205-208 by pressing one or more general purpose and/or dedicated keys and/or buttons of an input interface, such as a keyboard, keypad, and/or touch screen of the device(s) 205-208. For instance, an input interface may include a dedicated button to initiate a connection with the conference call manager 105, or the user may dial the general call-in telephone number to participate in the conference call. The conference call client 210 may respond to the input by establishing a connection to the conference call based on, for example, the call-in telephone number stored in a memory of the VoIP-enabled device 205-208, and/or an IP address of the example conference call manager 105 stored in the memory of the VoIP-enabled device 205-208. As discussed in further detail below, the conference call client 210 may facilitate conference call connectivity for the user, user authentication with the conference call manager 105, and/or upload various authentication credentials from the VoIP-enabled device 205-208 to the conference call manager 105. Authentication credentials may include, but are not limited to, PINs, passwords, authorization codes, user names, and/or stored user voice samples for voice-print authentication at the conference call manager, discussed in further detail below.

To provide VoIP communication services, the example system of FIG. 2 includes any number and/or type(s) of VoIP communication networks, one of which is illustrated in FIG. 2 with reference numeral 230. To initiate, receive, establish, complete and/or route any type(s) of VoIP communication sessions and/or VoIP telephone calls with, to and/or between the example VoIP devices 205-208, the example VoIP communication network 230 of FIG. 2 may communicate with, and/or contain any portion of, any number and/or type(s) of call processing system(s) 235. The call processing system(s) 235 and/or VoIP networks 230 may be operated by one or more service providers.

In the example communication system illustrated in FIG. 2, the call processing system(s) 235 are implemented using an architecture commonly referred to in the industry as a "softswitch architecture" in that a first server (e.g., a media gateway 236) implements the actual transmitting, receiving and/or transcoding of communication session data, while a second server (e.g., a media gateway controller 237) implements the signaling, control, logic and/or protocol(s) to initiate, route and/or establish VoIP communication sessions. However, any type(s) of call processing system architecture(s) may be implemented. For example, the call processing system(s) 235 maybe implemented in accordance with a past, current and/or future 3rd Generation Partnership Program (3GPP) Internet Multimedia Subsystem (IMS) standard and/or specification, and/or maybe implemented using, for example, session border controllers, call processors, call serving controllers, etc.

The example call processing system(s) 235 of FIG. 2 can include one or more optional SIP Proxies 238 to assist with the processing and/or routing of SIP messages and/or SIP exchanges that are used by VoIP devices 205-208 to initiate and/or establish VoIP communication sessions.

As illustrated in FIG. 2, the example VoIP communication network 230 may include an interface to and/or contain any portion of a public land mobile network (PLMN) 240 (i.e., a cellular communication network), an interface to and/or contain any portion of a PSTN 245, and/or an interface to and/or contain a portion of any number and/or type(s) of additional communication networks, such as the IP network 115 (e.g., the Internet). For example, using any number and/or type(s) of technique(s), method(s), protocol(s) and/or technology(-ies), the call processing system(s) 235 and the PSTN 245 can facilitate telephone calls between a PSTN-based phone (not shown) and any of the example VoIP-enabled devices 205-208.

The example PLMN 240 and/or the example PSTN 245 of FIG. 2 may be implemented by any number and/or type(s) of communication device(s), switch(es), protocol(s), system(s) and/or technology(-ies). For instance, the example PLMN 240 may include any number of cellular base stations that can transmit cellular signals to and/or receive cellular signals from a cellular communication device (not shown) using any type(s) of protocols (e.g., time-division multiple access (TDMA), code-division multiple access (CDMA), orthogonal frequency-division multiple access (OFDM), etc.).

In the illustrated example of FIG. 2, the example VoIP devices 205-208 are communicatively coupled to the example VoIP communication network 230 via any number and/or type(s) of public and/or private IP networks 115 such as the Internet. However, any number and/or type(s) of past, current and/or future communication network(s), communication system(s), communication device(s), transmission medium(s), protocol(s), technique(s), specification(s) and/or standard(s) could be used to couple the VoIP devices 205-208 to the VoIP communication network 230. Interfaces between the VoIP devices 205-208 and the IP network 115, and/or the VoIP communication network 230 and the IP network 115 may be implemented using any number and/or type(s) of past, current and/or future device(s), technology(-ies) and/or method(s). For instance, the example VoIP devices 205-208 may be coupled to the IP network 115 via any type(s) of voiceband modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), access point(s), etc. Moreover, the example TP network 115 of FIG. 1 may extend geographically to include a location near to and/or encompassing a VoIP device 205-208. For example, the LP network 115 may include a wireless access point (not shown) by which, for example, the example WiFi IP phone 208 connects to the IP network 115.

While an example VoIP communication network 230 has been illustrated in FIG. 2, the devices, networks, systems, and/or processors illustrated in FIG. 2 may be combined, divided, re-arranged, eliminated and/or implemented in any other manner. For example, the example call processing system(s) 235 illustrated in FIG. 2 may be a logical entity of the example VoIP communication network 230 and, thus, need not be implemented separately. Further, any or all of the example VoIP devices 205-208, the example conference call client 210, the example call processing system(s) 235 and/or, more generally, the example VoIP communication network 230 of FIG. 2 may be implemented by hardware, software, firmware and/or any combination of hardware, software and/or firmware. Moreover, the example VoIP communication network 230 may include additional servers, systems, networks, gateways, portals, and/or processors than those illustrated in FIG. 2, and/or may include more than one of any or all of the illustrated devices, servers, networks, systems, gateways, portals, and/or processors.

While the example VoIP-enabled devices 205-208 of FIG. 2 include conference call clients 210 that implement substantially similar functionality, a particular conference call client 210 implemented by any of the VoIP-enabled devices 205-208 may differ in any way(s) from a conference call client 210 implemented by any other VoIP-enabled device 205-208. For example, a first example conference call client 210 (e.g., implemented by the example PC 207) may be implemented as machine accessible instructions executed by a processor, while a second example conference call client 210 (e.g., implemented by the example VoIP phone 205) is implemented as any combination of firmware, hardware and/or logic. Further, the example conference call client 210 may differ in the number and/or type(s) of features they implement and/or perform.

Figure 3:
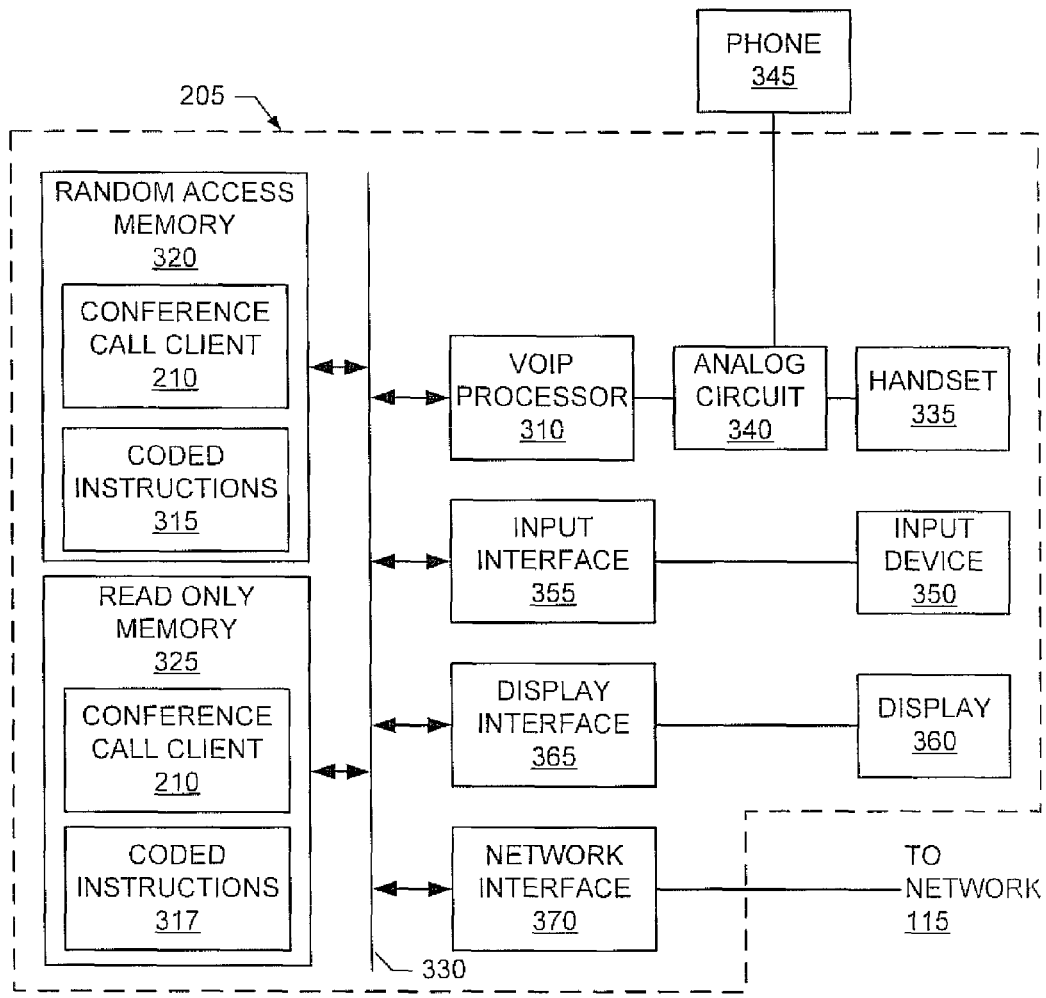
FIG. 3 illustrates an example manner of implementing any or all of the example VoIP devices of FIGS. 1 and 2.

FIG. 3 illustrates an example manner of implementing any or all of the example VoIP-enabled devices 205-208 and/or the example conference call client 210 of FIG. 2. While any of the example VoIP-enabled devices 205-208 and/or the example conference call client may be represented by FIG. 3, for ease of discussion, the example device of FIG. 3 will be referred to as VoIP-enabled device 205. To handle VoIP processing functions, the example VoIP-enabled device 205 of FIG. 3 includes any number and/or type(s) of VoIP processors 310. The example VoIP processor 310 of FIG. 3 implements, among other things, session control, VoIP protocols, a SIP user agent, and a coder (not shown) to encode audio and/or video signals, a decoder (not shown) to decode received audio and/or video signals, a packetizer (not shown) to packetize encoded data and a de-packetizer (not shown) to de-packetize encoded data.

In addition to any number and/or type(s) of specialized hardware, firmware and/or logic to perform VoIP processing functions, the example VoIP processor 310 of FIG. 3 may include any number and/or type(s) of specialized and/or general purpose controller(s) and/or processing unit(s) capable of executing coded instructions. For example, the controller and/or processing unit may perform any number and/or type(s) of VoIP processing functions by carrying out and/or executing coded instructions 315 and/or 317 present in a main memory of the VoIP processor 310 (e.g., within a random-access memory (RAM) 320, a read-only memory (ROM) 325 and/or on-board memory of the VoIP processor 310). For example, all or some of the coded instructions 315 and/or 317 may be executed to implement the example conference call client 210 of FIG. 2, and/or the example machine accessible instructions discussed below in connection with FIGS. 8-10. Additionally or alternatively, any or all of the example conference call client 210 of FIG. 2, and/or the example machine accessible instructions of FIGS. 8-10 may be implemented as hardware, software, firmware and/or logic and/or any combination(s) of hardware, software, firmware and/or logic within the example VoIP-enabled device 205 of FIG. 3.

The example VoIP processor 310 is in communication with the main memory (including a read-only memory (ROM) 325 and/or the RAM 320) and other devices and/or modules of the example VoIP-enabled device 205 of FIG. 3 via any type(s) and/or number of buses 330. The example RAM 320 may be implemented by, for example, dynamic random-access memory (DRAM), synchronous dynamic random-access memory (SDRAM), and/or any other type of RAM device(s). The example ROM 325 may be implemented by, for example, Hash memory(-ies) and/or any other desired type of memory device(s). Access to the example memory 320 and 325 is typically controlled by a memory controller (not shown). Additionally or alternatively, the example RAM 320 and/or example ROM 325 of FIG. 3 may be used to store data 215 received by and/or transmitted by the example VoIP-enabled device 205 of FIG. 3 via a data communication session.

To electrically couple signals (e.g., speech signals) between a handset 335 and the example VoIP processor 310, the example VoIP-enabled device 205 of FIG. 3 includes any number and/or type(s) of analog circuits 340. An example analog circuit 340 includes any number and/or type(s) of filter(s), analog-to-digital converter(s) and/or digital-to-analog converter(s) to convert between analog signals sent to and/or received from an example handset 335 and digital signals sent to and/or received from the example VoIP processor 310. The handset 335 can be corded or cordless.

If a cordless handset 335 is to be employed, the example analog circuit 340 of FIG. 3 is implemented with any number and/or type(s) of wireless communication technologies to communicatively couple the example VoIP processor 310 with any type of cordless handset 335. Moreover, the example analog circuit 340 of FIG. 3 may, additionally or alternatively, implement any number and/or type(s) of subscriber line interface circuits (SLICs) that allow any number and/or type(s) of corded and/or cordless PSTN-based telephones 345 to be electrically coupled to the example VoIP processor 310 of FIG. 3. The latter example could be used, for instance, in implementations where the example VoIP-enabled device 205 is located in and/or implements a VoIP analog telephone adapter (ATA) and/or residential gateway (RG).

To facilitate user inputs via any type of input device 350 (e.g., a keypad, a keyboard and/or a touch screen), the example VoIP-enabled device 205 of FIG. 3 includes any type of input interface 355. The example input interface 355 of FIG. 3 electrically couples and/or translates electrical signals conveying key and/or button press information from the example input device 350 to the example VoIP processor 310. The example input interface 355 and/or the example input device 350 may be used by a user to initiate and/or establish a parallel and/or secondary data communication session that may be used by, for example, the VoIP processor 310 and/or any application implemented by and/or within the example VoIP-enabled device 205 to send, for instance, the example user identification (ID), device ID, and/or voice-print information 215 to the conference call manager 105 (of FIG. 1).

To provide output information to a user via any number and/or type(s) of displays 360, the example VoIP-enabled device 205 of FIG. 3 includes any number and/or type(s) of display interfaces 365. An example display interface 365 receives information (e.g., alphanumeric characters) to be displayed from the example VoIP processor 310 and creates electrical signals suitable for displaying the information on the example display 360. The display 360 of the illustrated example is a liquid-crystal display (LCD) screen. The example display interface 365 and/or the example display 360 may also be used to, for example, display pictures, text (e.g., alphanumeric characters) and/or video received by the example VoIP-enabled device 205 via a parallel and/or secondary data communication session.

To communicatively couple the example VoIP-enabled device 205 to the example IP network 115 of FIGS. 1 and 2, a local-area network (LAN), a modem, a router, a bridge and/or a gateway, the example VoIP-enabled device 205 includes any number and/or type(s) of network interfaces 370. The example network interface(s) 370 of FIG. 3 implement any number and/or type of communication and/or data interface(s) in accordance with any past, current and/or future standards such as Ethernet, DSL, WiMax, WiFi, cable modems, etc.

While an example VoIP-enabled device 205 is illustrated in FIG. 3, the VoIP-enabled device 205 may be implemented using any number and/or type(s) of other and/or additional processors, devices, components, circuits, modules, interfaces, etc. Further, the processors, devices, components, circuits, modules, elements, interfaces, etc. illustrated in FIG. 3 may be combined, divided, re-arranged, eliminated and/or implemented in any of a number of ways. Additionally, any or all of the example VoIP-enabled devices 205 may be implemented as any combination of firmware, software, logic and/or hardware. Moreover, the example VoIP-enabled device 205 may include additional processors, devices, components, circuits, interfaces and/or modules in addition to those illustrated in FIG. 3 and/or may include more than one of any or all of the illustrated processors, devices, components, circuits, interfaces and/or modules.

Figure 4:
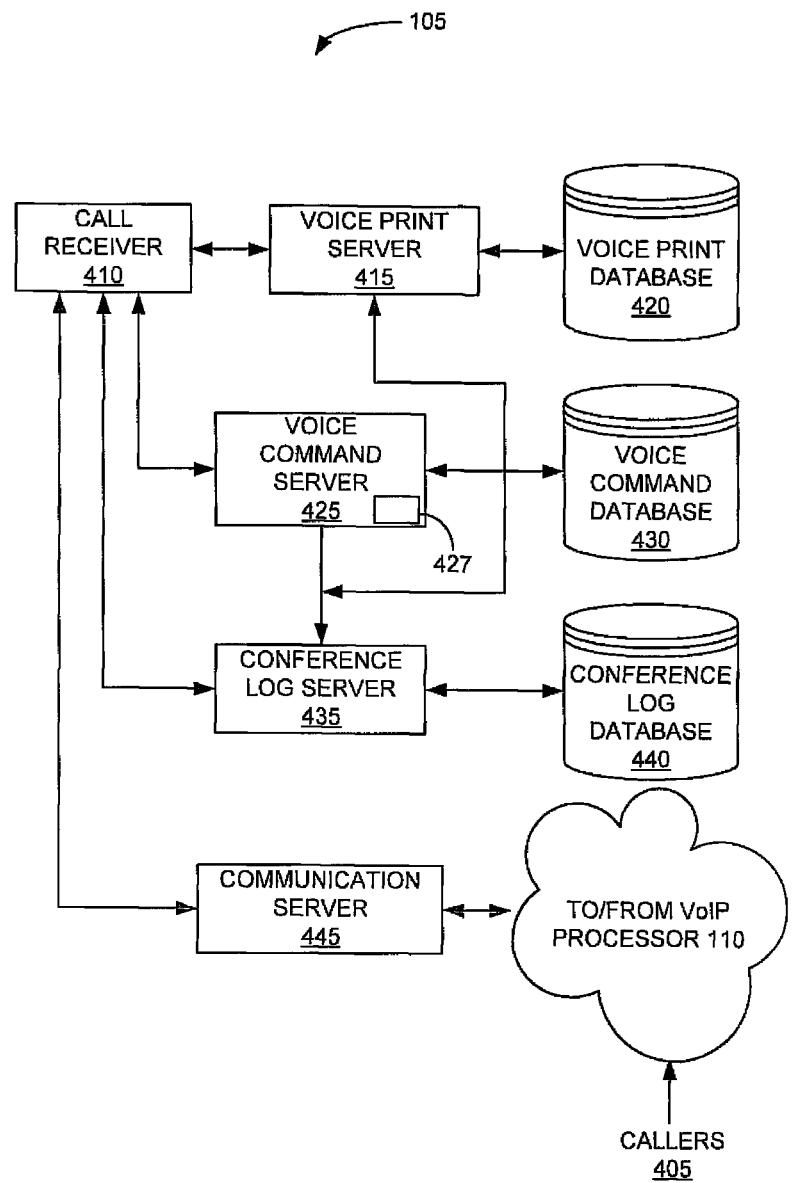
FIG. 4 is a schematic diagram illustrating an example system to manage conference call activity.

FIG. 4 illustrates the example conference call manager 105 of FIG. 1 in greater detail. As mentioned above, callers 405 may dial a call-in telephone number to participate in a conference call. The call-in number may be dialed by any and/or all call participants and is, thus, referred to as a "common telephone number." A call receiver 410 at, for example, a conference call center may be assigned the common telephone number, a web address (e.g., HTTP), and/or an IP address. For example, the call receiver 410 may be a multi-line telephone or a conference bridge that permits the callers 405 from the same and/or diverse locations to be connected together. The conference bridge typically amplifies and/or balances audio signal levels for each of the callers so that every participant can hear and/or speak to each other during the conference call. The call receiver 410 may be located at a company associated with one or more of the conference call participants 405, or may be located at a third party conference call service provider such as AT&T.

The example system 105 of FIG. 4 also includes a voiceprint server 415 to identify callers 405 by their voices. For example, when a caller 405 dials in to the call receiver 410 via the VoIP processor 110 and speaks their name and/or a password, the voiceprint server 415 converts the vocal information into an electronic proxy or signature (e.g., an analog signal such as a waveform having an amplitude and time axis, a digital signal, such as a fast Fourier transform value of the received signal, a digital value, etc.) that is unique to at least one aspect of the caller's voice (hereinafter "voiceprint"). Alternatively, the caller 405 may have a representative voice sample stored on their VoIP-enabled device 205 (e.g., a voice sample stored in the RAM 320 as data 215) that is uploaded to the call receiver 410 via the IP network 115 and the VoIP processor 110. The voiceprint server 415 of the illustrated example accesses a voiceprint database 420 to perform a search for an equivalent voiceprint (i.e., an electronic proxy substantially the same as the electronic proxy for the caller's voice signal). If such an equivalent voiceprint is found in the voiceprint database 420, then an identifier associated with the voiceprint is retrieved from the voiceprint database 420. The identifier may be, for example, the caller's name, the caller's phone number, a pseudonym for the caller, etc. As discussed in further detail below, the voiceprint server 415 monitors the conference call for voiceprints to identify call participants, to associate conference call activities with identified callers, and/or to respond to voice commands. Additionally or alternatively, the call receiver 410 may monitor all incoming data from the callers 405 and identify conference call participation authority via an associated IP address, as discussed in further detail below.

If the voiceprint server 415 searches the voiceprint database 420 and fails to find a match, the voiceprint server 415 of the illustrated example permits the caller to associate their voice with their identity (i.e., to establish a voiceprint). For example, the voiceprint server 415 may, upon failing to find a voiceprint match, play a recording of instructions for the caller to follow. Additionally or alternatively, the voiceprint server 415 may provide instructions to the call receiver 41.0 to display instructions on the display 360 of the caller's 405 VoIP enabled device 205. The recording and/or display 360 instructions may request that the caller recite one or more words designed to generate a unique voiceprint indicative of that caller. Alternately, such caller identification may be performed (or even be required to be performed) apart from a conference call (e.g., in a separate call to set up the service prior to the call.)

Figure 5:
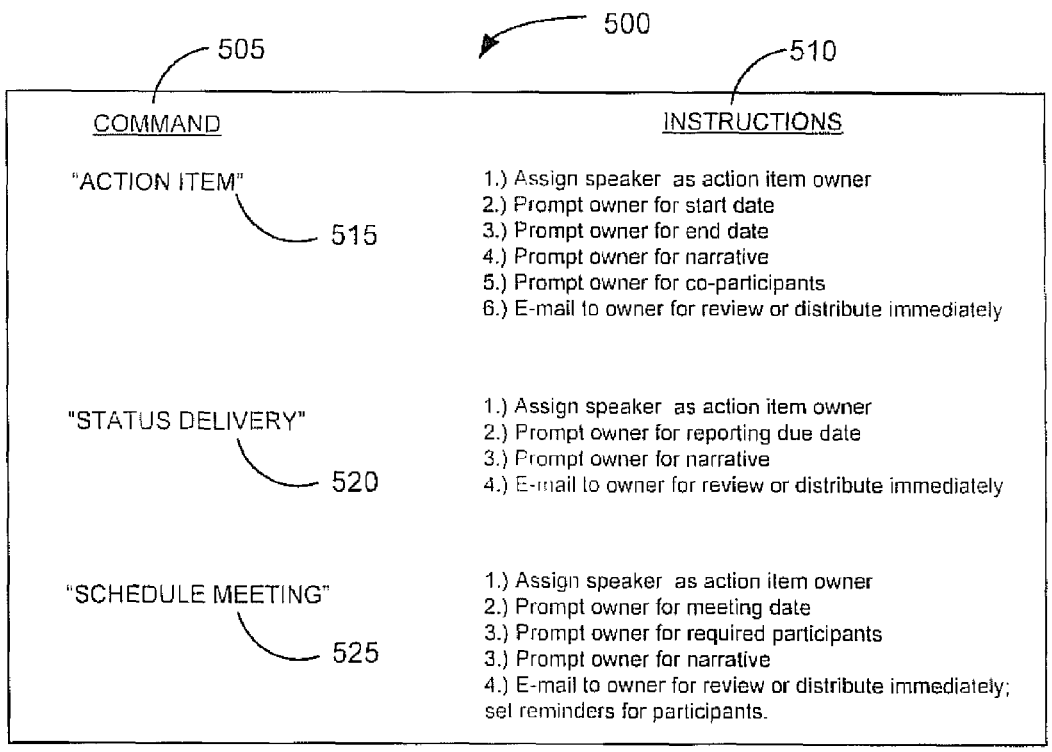
FIG. 5 is an example portion of a database table of the example system to manage conference call activity of FIG. 4.

The example system 105 of FIG. 4 also includes a voice command server 425 to monitor the conference call for voice commands. The voice command server 425, which, in the illustrated example, is operatively connected to the call receiver 410, receives the same audio signals as the conference participants and/or the voice print server 415, and compares received words and phrases extracted from those audio signals to specific commands previously stored in a voice command database 430. The voice command database 430 may contain one or more tables of commands, such as the example command table 500 shown in FIG. 5. The command table 500 of the illustrated example includes a command column 505 and an instruction column 510. The command column 505 includes entries identifying various verbal commands to which the voice command server 425 will respond. As shown in FIG. 5, the example command column 505 includes the example commands of "action item" 515, "status delivery" 520, and "schedule meeting" 525. Each example command corresponds to a list of one or more instructions to be executed in response to a participant's recitation of the corresponding command. The instructions are stored in the instruction column 510 adjacent to the corresponding commands. As discussed in further detail below, the meeting facilitator may view the complete list of voice commands via a graphical user interface (GUI) (e.g., a web-based GUI). As discussed in further detail below, the meeting facilitator may edit, delete, and/or otherwise modify the functionality of the voice commands via the GUI.

The voice command server 425 of the illustrated example also includes a memory 427 (e.g., a Hash memory) containing a list of some or all of the commands capable of being executed by the server 425. However, unlike the example voice command database 430, which contains all the commands and all corresponding instructions, the example memory 427 only includes the instructions for the most frequently used commands. In other words, the memory 427 does not include the instructions for less commonly used commands. This reduced instruction set may reduce response time after a command is spoken by a participant by eliminating a fetch (e.g., a database query) to the voice command database 430.

Figure 6:
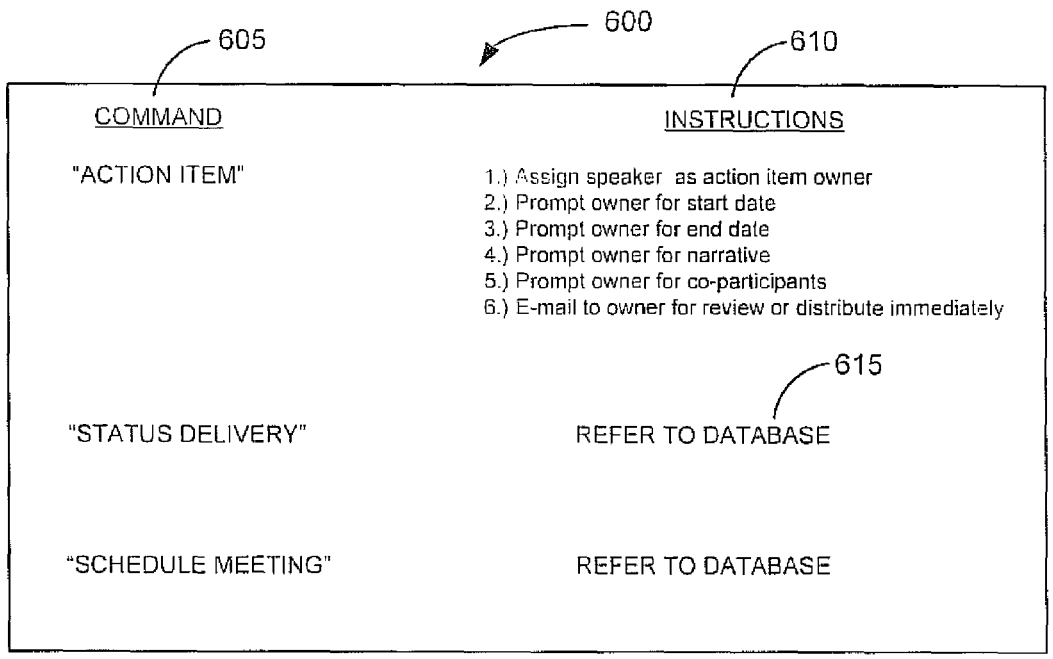
FIG. 6 is an example portion of a flash table of the example system to manage conference call activity of FIG. 4.

In the illustrated example, the memory 427 includes an example local memory table, such as the table 600 shown in FIG. 6. The example local memory table 600 includes a command column 605 and an instruction column 610, much like the command table 500 of FIG. 5. However, unlike FIG. 5, the local memory table 600 of FIG. 6 only includes instructions for the most frequently used commands. Such reduced command list minimizes memory size requirements of the (e.g., flash) memory 427, while still reducing command execution time. In particular, because many commands can be handled simply by accessing the local memory table 600, the frequency at which the voice command server 425 queries the voice command database 430 is reduced. If a participant speaks a command that does not have a corresponding instruction in the instruction column 610 of the local memory table 600, a "refer lo database" instruction 615 causes the voice command server 425 to query the voice command database 405 for the corresponding instructions.

The local memory table 600 may be dynamic in that the set of commands with corresponding instructions can change based on usage patterns, or change based on modification by the meeting facilitator. In such an approach, a threshold metric may determine the instructions stored in the local memory table 600. Such threshold metrics may include, but are not limited to, a threshold number of recited commands per unit of time (e.g., a command recited by a participant more than two limes within a 10-minute period), and a frequency weight of commands recited (e.g., the top 5 historically most frequently recited commands). Alternatively, the local memory table 600 may be static (e.g., pre-set based on typical usage pattern, estimated usage patterns, arbitrary usage patterns, meeting facilitator preferences, etc.).

The example conference call manager 105 of FIG. 4 may accept voice commands from any and/or all of the call participants. However, because the example conference call manager 105 is able to identify callers based on voiceprints, it is also able to enforce an authorization policy wherein some speakers are permitted to issue certain commands, and/or some speakers are not permitted to issue certain commands. To this end, the conference call manager 105 may be programmed to place participants in authorization categories or levels. For example, a meeting facilitator or one or more other persons of high importance may have a maximum permitted level of authorization to issue voice commands. Thus, for example, the meeting facilitator may be permitted to issue commands that dictate when the conference call is over (e.g., a voice command "End Meeting", commands to go off record, and/or other commands). Other conference call participants of lesser authority, such as mid-level managers, for example, may have a second/lower level of authorization that permits usage of a lesser number of commands during the conference call than the first authorized level. For example, mid-level managers may be permitted to issue voice commands such as "Action Item," in which project tasks are assigned to various project members, but if they issue higher-level commands (e.g., an "End Meeting" command) the conference call manager 105 will not respond. Additionally or alternatively, if a meeting participant has a lower authorization level (no authorization), then such participants may merely listen to the other conference call participants, or contribute to meeting discussion, but any commands they issue will be disregarded by the conference call manager 105. Furthermore, if the meeting facilitator chooses to add and/or delete authorization levels during the meeting, the meeting facilitator may make such modifications in real-time via, for example, a web-based GUI. The meeting facilitator may also choose to publish a live list of meeting attendees for the other participants to view, or hide such participant list information, as desired.

Controlling the authorization of various conference call participants may also be accomplished by tracking the caller's 405 IP address. For example, a first caller 405 may dial-in to the call receiver from the VoIP-enabled device 205 and authenticate with the voice print server 415 by speaking a representative assortment of words and/or by the conference call client 210 sending a previously stored representative voice recording (e.g., stored as data 215 in the RAM 320) to the voice print server via the VoIP processor 110. The example conference call client 210 may also send the IP address of the VoIP-enabled device of the first caller 405. The call receiver 410 receives the IP address of the first caller 405 and associates it with the caller's 405 authorization status. Turning briefly to FIG. 7, an example IP-based authorization table 700 is shown. The IP-based authorization table 700 of the illustrated example includes an IP address column 705 and an authorization column 710. The IP address column 705 includes entries identifying various IP addresses from callers 405 that have established a connection to the example conference call manager 105 to participate in a conference call. The authorization column 710 includes IP addresses that define the level of conference call authorization for each corresponding IP address. For example, a first row 715 of the example authorization table 700 illustrates that the IP address "192.168.254.32" is associated with an authorization of "Listen," which only allows the caller 405 to hear conference call participants, but does not permit vocal participation. On the other hand, a second row 720 of the example authorization table 700 illustrates that the IP address "192.168.254.17" is associated with an authorization of "Full," which allows the caller 405 to exercise any and all voice commands within the voice command database 430. In the illustrated example, a manager and/or system administrator of the example conference call manager 105 creates various subgroups of voice commands, each having a particular authorization category. Thus, in the example of FIG. 7, rows 725 and 730 of the example authorization table 700 illustrate the sub-categories of authorization associated with certain IP addresses.

Although the above example discusses four levels of authorization, persons of ordinary skill in the art will appreciate that other numbers of levels are likewise appropriate. Further, persons of ordinary skill in the art will appreciate that the example conference call manager 105 enforces the authorization policy by simply ignoring unauthorized commands from speakers and/or by issuing a sound or other signal light indicating the requested action is blocked by the authorization mechanism to ensure that participants are aware their requested action was refused. For example, attempts by unauthorized callers 405 to invoke various voice commands may prompt the call receiver 410 to transmit a "command denied" message to one or more of the callers' 405 VoIP-enabled device(s) 205, such as on the display(s) 360.

Voice commands recognized by the voice command server 425, and confirmed by the voice print server 415 as belonging to an authorized conference call participant, may be confirmed via a confirmation message presented on the display 360 of one or more of the example VoIP enabled device(s) 205. In the illustrated example conference call manager 105 of FIGS. 1 and 4, the voice command issued by the authorized participant (e.g., the meeting facilitator) is presented on the VoIP enabled device 205 of the authorized participant with a request to confirm execution of the voice command. For example, the confirmation message may recite, "Are you sure you wish to end the meeting?" The example display 360 may also include two soft keys, one of which is associated with a "Yes" answer, and the other associated with a "No" answer. As such, if the authorized participant happens to recite one or more of the action item commands (e.g., "end meeting") in normal conversation rather than as an intention voice command, then the conference call manager 105 will not erroneously execute an unintended command. Persons having ordinary skill in the art will appreciate that soft keys may represent user selectable buttons that allow the user to trigger one or more events and/or select one or more features. As discussed in further detail below, soft keys presented on the example display 360 may allow the user to select an action item rather than, or in addition to reciting the desired action item by voice. The soft keys may be arranged on the example display 360 in any orientation with respect to the proximity of adjacent soft keys present on the display 360.

Returning to FIG. 4, the example conference call manager 105 also includes a conference log server 435 to receive and record a chronological log of events and conversations that occur during the conference call. The example conference log server 435 of FIG. 4 includes a voice-to-text engine and saves converted text log data to a conference log database 440. The conference log server 435 is communicatively connected to the call receiver 410 and may, before converting voice-to-text, initiate a request to the voiceprint server 415 to determine if the voice belongs to an authorized participant. Alternatively, if a complete log is desired, the log server 435 may log all detected conversations during the call. As discussed in further detail below, if non-authorized voices are received by the call receiver, they may be ignored while still allowing such participants to listen.

Upon completion of the conference call, the call receiver 410 of the illustrated example instructs a communication server 445 to publish the conference log to, for example, one or more web pages accessible via the Internet and/or intranet 115 and/or to publish the log by forwarding the same to one or more e-mail addresses. For example, the communication server 445 may include a web and/or e-mail server which, additionally or alternatively, e-mails the conference log to the conference participants, to a selected subset thereof and/or to a third party (i.e., another call participant). In the illustrated example, the communication server 445 transmits a termination message to one or more of the callers 405, which is displayed on the display 360 of the VoIP-enabled device 205. Additionally or alternatively, the communication server 445 may transmit a message to include web address information from which the callers 405 may later retrieve a log of the completed conference call. Rather than immediately publishing the conference log to the Internet/intranet and/or e-mailing the log to the participants, a subset of the participants, and/or a non-participant, the example conference call manager 105 may allow the meeting facilitator to review, edit, and/or redact the conference log prior to publication. Log output formats may include, but are not limited to, Microsoft Word®, ASCII text, and/or Adobe® PDF.

Figure 8:
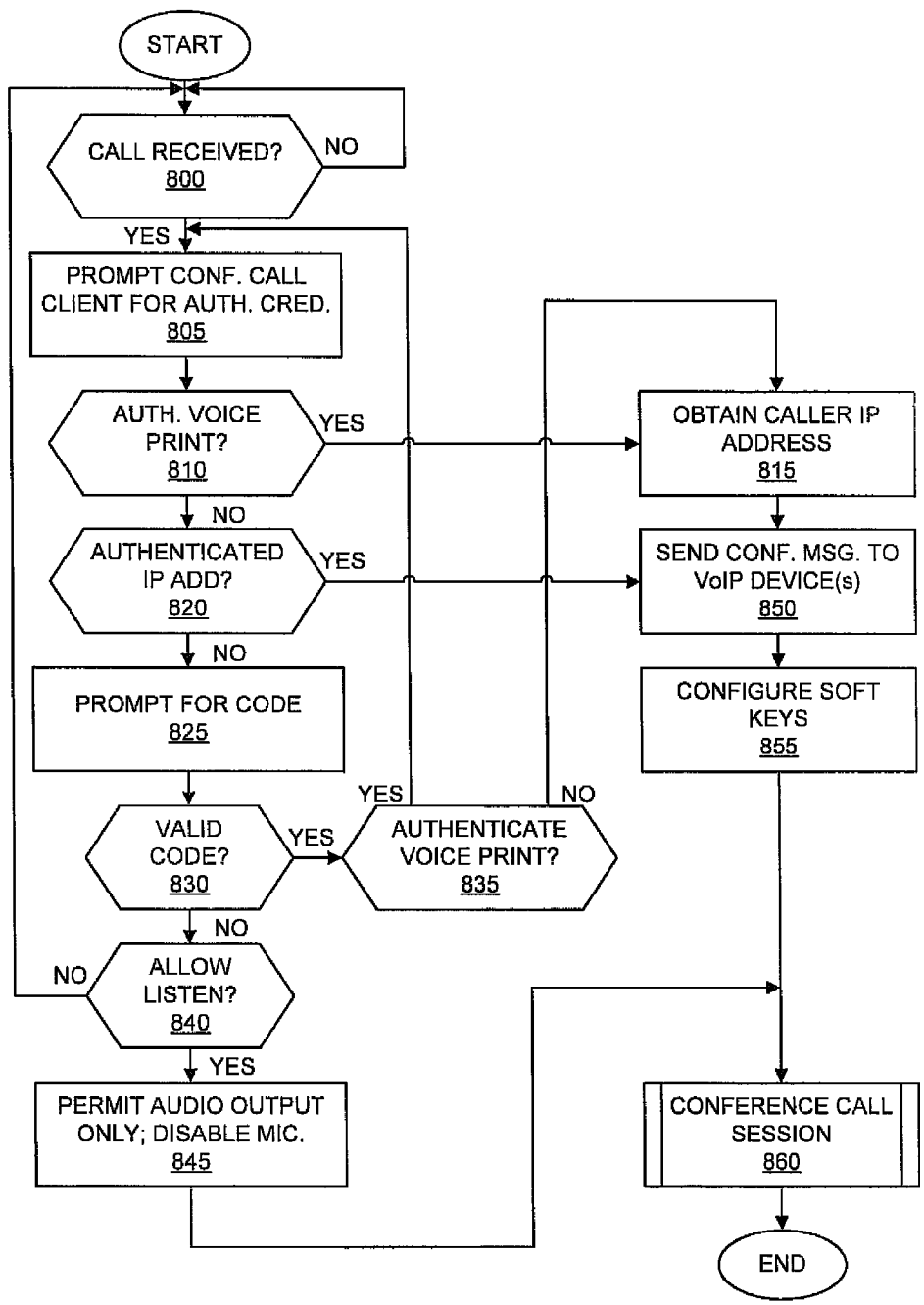
FIGS. 8-10 are flow diagrams representative of example machine readable instructions which may be executed to implement the example system to manage conference call activity of FIG. 1.
Figure 9:
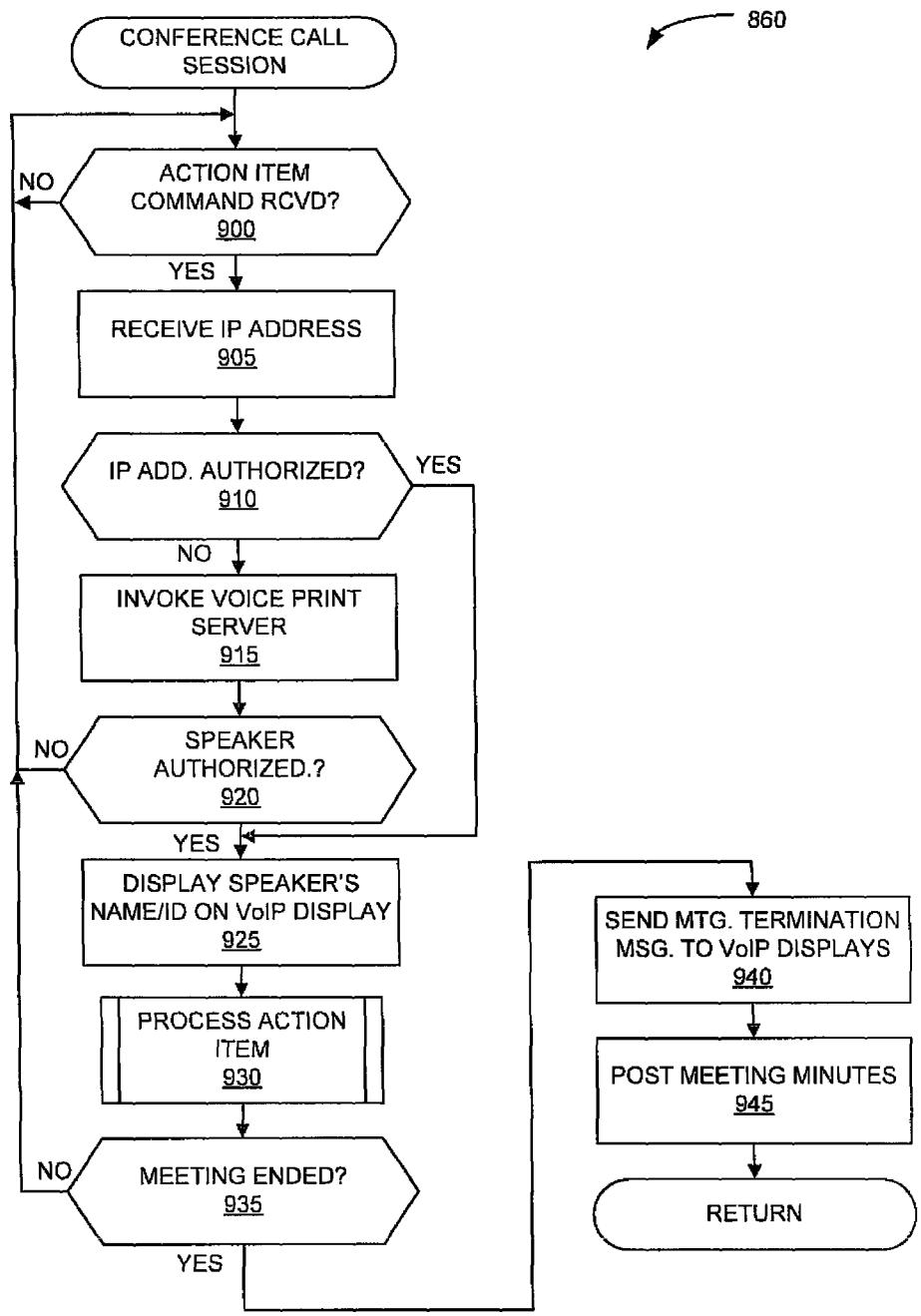
Figure 10:
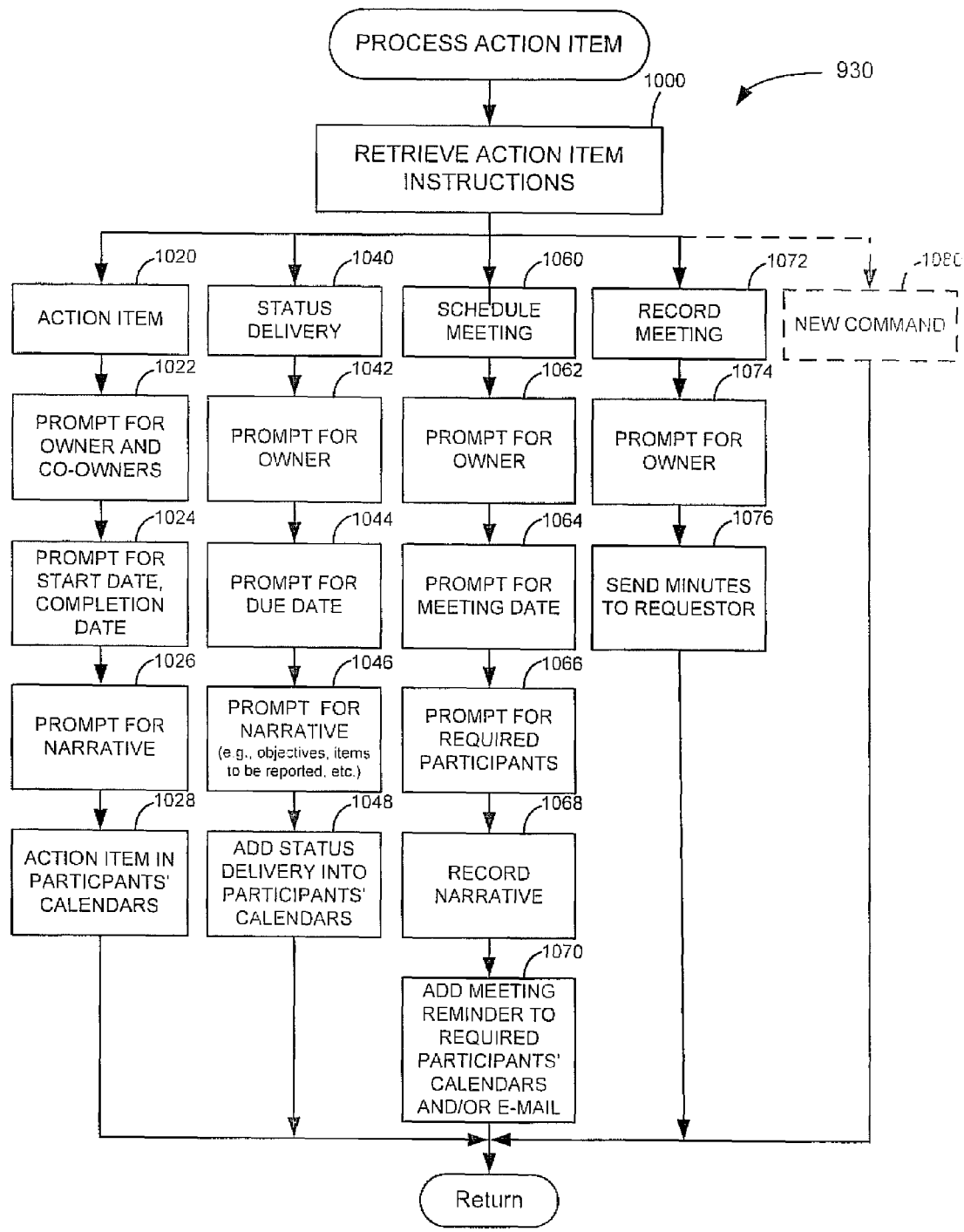

Flowcharts representative of example machine readable instructions for implementing the example system 100 to manage conference call activity with VoIP networks of FIGS. 1-7 are shown in FIGS. 8-10. In these examples, the machine readable instructions comprise a program for execution by: (a) a processor such as the processor 1205 shown in the example computer 1200 discussed below in connection with FIG. 12, (b) a controller, and/or (c) any other suitable processing device. The program may be embodied in software stored on a tangible medium such as, for example, a flash memory, a CD-ROM, a floppy disk, a hard-drive, a digital versatile disk (DVD), or a memory associated with the processor 1205, but persons of ordinary skill in the art will readily appreciate that the entire program and/or parts thereof could alternatively be executed by a device other than the processor 1205 and/or embodied in firmware or dedicated hardware in a well-known manner (e.g., it may be implemented by an application specific integrated circuit (ASIC), a programmable logic device (PLD), a field programmable logic device (FPLD), discrete logic, etc.). For example, any or all of the system 100 to manage conference call activity with VoIP networks, the conference call manager 105, the VoIP processor 110, the VoIP devices 120, the call processing system(s) 235, the conference call client 210, the call receiver 410, the voiceprint server 415, the voiceprint database 420, the voice command server 425, the voice command database 430, the conference log server 435, the conference log database 440, and the web communication server 445 could be implemented by software, hardware, and/or firmware. Also, some or all of the machine readable instructions represented by the flowcharts of FIGS. 8 and 9 maybe implemented manually. Further, although the example program is described with reference to the flowcharts illustrated in FIGS. 8 and 9, persons of ordinary skill in the art will readily appreciate that many other methods of implementing the example machine readable instructions may alternatively be used. For example, the order of execution of the blocks may be changed, and/or some of the blocks described may be changed, substituted, eliminated, or combined.

The program of FIG. 8 begins at block 800 where the example system 100 monitors one or more communication lines (e.g., telephone lines, VoIP networks, etc.) for incoming calls. In particular, the call receiver 410 is assigned a telephone number and/or an TP address on a network that, when accessed, causes the network to communicatively connect the calling conference call participant(s) 405 to the system 100. Alternatively, rather than providing each caller 405 with the telephone number assigned to the call receiver 410, the callers may be provided with an IP address, a web address, one or more telephone numbers that are within their local calling area, and/or one or more toll-free numbers (e.g. 800 numbers). Persons of ordinary skill in the art will appreciate that alternate telephone numbers, web addresses, and/or IP addresses may, via a service/signal control point (SCP), DNS server, and/or similar device, route the calls to the call receiver 410 to communicatively connect callers 405 to the system 100 and to one another.

If no calls are received at block 800, then the program loops at predetermined intervals until a call is received. When a call is received (block 800), the call receiver 410 returns a confirmation message to the calling VoIP-enabled device 205. In the illustrated example, the call receiver 410 instructs the conference call client 210 of the VoIP-enabled device 205 to provide authorization credentials, if any (block 805). As described above, the conference call client 210 may have a representative voiceprint sample saved in a memory of the VoIP-enabled device 205. Additionally or alternatively, the voiceprint server 415 may prompt the caller 405 to authenticate their voice and/or otherwise identify themselves (block 805). For example, the system 100 may, at block 805, play a recorded message and/or present instructions on the display 360 that request the caller 405 to speak their name and/or enter a passcode. The meeting facilitator may set-up the conference call such that all callers 405 must speak their names for authentication (block 810) before proceeding to, and/or participating in the conference call. For example, after the caller 405 speaks their name, the voiceprint server 415 queries the voiceprint database 420 for a corresponding voiceprint match. Such a voice sample may include the caller 405 reciting the alphabet, counting to ten, and/or reciting his or her name aloud. The representative vocal sample is saved in the voiceprint database 420 and used for later authentication purposes, as needed. If callers' 405 voices match a voiceprint in the voiceprint database 420, the call receiver 410 instructs the conference call client 210 associated with the caller to transmit the caller's IP address (block 815), which is saved to an authorization table, such as the authorization table 700 discussed in view of FIG. 7.

In the event that the conference call client 210 does not return a voiceprint as the authentication information, the call receiver 410 determines whether the source IP address is authenticated (block 820). For example, if the caller's 405 IP address matches one in the example authorization table 700, then in the illustrated example, the caller 405 is deemed authorized to participate in the conference call, in which that caller 405 has a predetermined authority level (e.g., listen only, full privileges, voice command subgroup A, voice command subgroup B, etc.). However, if the caller's IP address does not match one of the entries in the example authorization table 700, then the example call receiver 410 requests that the caller 405 enter an authorization code at their corresponding VoIP-enabled device 205 (block 825). For example, the meeting facilitator may allow callers 405 to participate in the conference call despite those callers not having a corresponding voiceprint in the voiceprint database 420 by providing them with a passcode. If the caller 405 enters the correct passcode (e.g., a 4-digit number previously sent to the prospective caller via e-mail) at block 830, then that caller may have their voice authenticated by the system 100 at block 835 or may simply be allowed to participate in the call as a zero authorization participant (i.e., disallowing that caller from commanding the system 100 by voice). If the user authenticates their voice, the process may thereafter advance back to block 805 to test the new voiceprint. As discussed above, voiceprint authentication for a new caller 405 begins with the voiceprint server 415 requesting that the caller provide a representative sample of their voice (block 805).

Returning to block 830, if the caller 405 fails to enter the correct passcode and/or does not know the passcode, the call receiver 410 determines whether the caller may participate in the conference call at block 840. The meeting facilitator may allow callers 405 without a passcode to have limited or no access to the conference call. If the meeting facilitator configures the system to allow only callers 405 that have either an authenticated voiceprint and/or a valid passcode, then the system blocks the caller's 405 access (e.g., by disconnecting the unauthorized caller) (block 840) and resumes waiting for prospective participants (block 800). Alternatively, if the facilitator configures the system 100 to allow access for the caller 405 without a valid passcode, then the caller is permitted to listen to the conference call (block 845). The caller may be permitted to listen to the call but audio signals (e.g., voice) from the caller may be blocked. Additionally or alternatively, the example call receiver 400 may instruct the conference call client 210 to disable the microphone of the VoIP-enabled device 205 so that interruptions from the non-privileged caller do not occur. However, in situations where the call receiver 410 does not have access to the conference call client 210 and/or the non-privileged caller does not have the conference call client 210 operating on the VoIP-enabled device 205 (e.g., operating as an application programming interface (API)), then the call receiver 410 may block all incoming transmissions from the IP address associated with the non-privileged caller. Such a configuration in which callers 405 may not speak is particularly useful to facilitate corporate announcements to employees (e.g., corporate reorganization announcements, quarterly finance announcements, etc.).

Returning to block 815, after the call receiver 410 receives a corresponding IP address of the conference call participant (e.g., one or more callers 405), then the call receiver 410 sends a confirmation message to the conference call client 210 of the VoIP-enabled device 205 to inform the caller that they are an attendee of the conference call (block 850). Persons of ordinary skill in the art will appreciate that the VoIP-enabled device 205 may convey message data to the caller(s) 405 via a visual display, such as the example display 360 described in view of FIG. 3, and/or via another mechanism such as an audible signal.

The conference call client 210 configures one or more user input devices 350 of the VoIP-enabled phone 205, such as softkeys and/or dedicated buttons (block 855). Such input devices 350 may facilitate additional communication between the conference call participant 405 and the conference call manager 105. For example, a softkey may be configured to operate as an "enter" key, thereby allowing the participant 405 to type in numeric and/or alphanumeric data using, for example, a phone keypad and then depressing the "enter" key when finished. In another example, a softkey may be configured to invoke a date entry service of the example conference call manager 105. For example, the participant 405 may issue a voice command "schedule meeting," which requires entry of a meeting date and/or time. As such, the participant has the option to speak the corresponding meeting date so that the voice command server 425 can convert the spoken date and/or time to text and set the meeting time. Alternatively, the participant 405 may depress the "enter date" soft key on the VoIP-enabled device 205 and then type in the date and/or time. As a result, the participant may interact with the services of the example conference call manager 105 while minimizing the verbal interruptions of the conference call meeting.

Upon completion of the soft key configuration, the caller 405 participates in the conference call session (block 860). An example manner of processing commands during a conference call session (block 860) is shown in further detail in FIG. 9. The program of FIG. 9 begins at block 900 where the example system 100 to manage conference call activity with VoIP networks monitors the voice signals associated with the conference call for action item commands. In particular, the voice command server 425 of the illustrated example receives audio signals corresponding to the participants' discussion, and determines whether a command has been issued by comparing the signals with entries in the voice command database 430 or the local memory 427. As discussed above in view of FIG. 5, the voice command database contains various commands in a command column 505 and associated command instructions in an instruction column 510. The call receiver 410 receives the IP address of die participant issuing a voice command (block 905) and compares the received IP address with the authorization table 700 (block 910). If the received IP address matches an entry of the authorization table 700 (block 910), then the participant is allowed to invoke one or more commands determined by virtue of his/her authorization status, such as the status shown in column 710 of FIG. 7. Alternatively, the authorized IP address may only have sufficient privileges to listen to the conference call activity rather than issue one or more voice commands. Control proceeds to block 925 for such participants having varying degrees of authorization, as discussed in further detail below.

For participants that do not have an IP address matching that found in the authorization table 700 (block 910), the call receiver 410 invokes the services of the voice print server 415 (block 915). If the voiceprint server 415 determines, after a query to the voiceprint database 420, that the speaker is not authorized to make the detected command (block 920), then program control returns to block 900 where the server 425 and/or the call receiver 410 continues monitoring for action item commands. If, on the other hand, the voiceprint server 415 determines, after a query to the voiceprint database 420, that the speaker of the detected command is authorized to make the detected command (block 920), then program control advances to block 925. The voice print server 435 instructs the call receiver 410 to invoke the display 360 of each VoIP enabled device 205 so that the conference call participants know who is currently speaking (block 925), and the action item is processed (block 930) for the authorized participant.

If the meeting has not ended, program control is directed from block 935 to block 900, where the system 100 continues to monitor for action item commands, as described above. The conference call meeting may end via an action item command being recited by a suitably authorized participant, and/or the meeting may end as a result of disconnection of all VoIP-enabled devices 205 (e.g., all participants hang up their phones). If such a command to end the meeting is issued, or if all of the conference call connections terminate (block 935), the call receiver 410 sends a conference call termination message to the conference call clients 210 of the VoIP-enabled devices 205. As a result, the conference call clients 210 invoke the display interface(s) 365 to display a message on the display 360 such as, for example, "The conference call has ended. You may hang-up your telephone" (block 940). Program control then advances to block 945, in which minutes from the conference call are published to some or all of the meeting participants and/or to one or more designated third parties.

Additional details of the example program of block 930 are shown in FIG. 10. The example program begins at block 1000 where the example system 100 retrieves instructions associated with the command recited by the speaker. In particular, the voice command server 425 branches program control to one of the recited commands including, but not limited to "action item" 1020, "status delivery" 1040, or "schedule meeting" 1060. Commands in addition to or instead of those illustrated in FIG. 10 (block 1080) may be programmed into the voice command server 425, as needed. Such commands may, for example, permit automatic entry of the task to be entered into an on-line calendar. If the calendar is networked among other members of the project team (via Microsoft Outlook®, for example), then the command may also enter start dates, end dates, and/or task objectives in the calendar for every team member.

Returning to the example of FIG. 10, if, for example, the speaker recited "action item" during the conference call (and the speaker was determined to be authorized to invoke this command) then program control advances from block 1000 to block 1020. As discussed above, the user may, additionally or alternatively, invoke the "action item" command by pressing a button or a soft key of the example VoIP phone 205. Without limitation, the example input device 350 of the VoIP phone 205 may allow the user to enter text and/or numerical information via, for example, a keyboard attached to or integrated with the example VoIP phone 205. The example instructions for the "action item" command generally include assigning an individual with a particular task and/or responsibility, for which the responsible party is expected to attempt to accomplish the task objectives by a particular due date. Accordingly, the voice command server 425 prompts the conference call participants for the name of the action item owner, (e.g., the person held responsible) (block 1022). For example, the voice command server 425 of the illustrated example plays a recorded message to the conference call participants that recites the phrase, "Please speak the name of the action item owner." Similarly, the voice command server 425 may also play a message requesting that the name(s) of any co-owners of the action item be recited (block 1022). Additionally or alternatively, the voice command server 425 may prompt the conference call participants for the name of the action item owner by displaying a text request on the display 360 of the example VoIP phone 205. For example, the display 360 may present the sentence, "Please type the name of the action item owner" (block 1022). Responses received by the voice command server 425 made by the speaker are converted to text by a speech-to-text engine included in, or operatively connected to, the voice command server 425. On the other hand, responses received by the voice command server 425 may be input by the user via the input device 350 of the example VoIP phone 205. As discussed in further detail below, the text generated by the speech-to-text converter is representative of what conference call participants say and/or type and is saved to a conference log database 440 via the conference log server 435. As such, the names of action item owners and/or co-owners are saved to the conference log database 440 for further review by, for example, the meeting facilitator when the conference call ends.

The voice command server 425 of the illustrated example also plays a message to the conference call participants requesting start and completion dates (block 1024). For example, the voice command server 425 may play a message that recites, "Please speak the month, day, and year for which this action item is to begin." Similarly, the voice command server 425 may play a message that recites, "Please speak the month, day, and year for which this action item is due." The recited information may identify data or may be left as "to be determined." Additionally, the voice command server 425 of the illustrated example may also prompt the conference call participants to enter start and completion dates (block 1024) by displaying text instructions on the display 360 of the example VoIP phone 205. In response to such instructions, the user may either type the response via the input device 350 (e.g., a keyboard) or recite such instructions by voice.

Information regarding the responsibilities and/or task objectives ("narrative") of the action item are then requested by the example system 100 of FIG. 1 (block 1026). In particular, the voice command server 425 of the illustrated example plays a message to the conference participants that recites, for example, "Please describe task objectives and/or responsibilities after the tone. Press the pound-key when you are finished." Additionally or alternatively, such instructions may be presented to the conference call participants via the display 360. The words spoken by the conference participants are then converted from speech-to-text and saved to the conference log database 440, and/or received via the input device 350 and saved to the conference log database 440.

Upon completion of the narrative at block 1026, the example program of FIG. 10 advances to block 1028 in which a flag is set to notify conference call participants of the new action item. For example, upon completion of the conference call, the meeting facilitator may review the conference log, which includes all commands that were invoked during the conference (either by voice or input textually via the input device 350). The meeting facilitator may either approve in full, approve in part, or deny the flag that notifies the conference call participants of the action item. If the meeting facilitator approves, then some or all of the conference call participants and/or one or more designated persons that did not participate in the call will receive notification of the action item. Notification may include sending an e-mail message and/or adding the action item to the electronic calendars of the conference call participants (block 1028). The individuals that receive the notifications may be selected, for example, by the meeting facilitator, may be identified to the system 100 with spoken commands during the call, or may default to the owner and/or co-owner identified at block 1022.

As discussed above, the voice command server 425 of the illustrated example may execute additional and/or alternative commands, such as a "status delivery" command, a "schedule meeting" command, and/or any other desired commands (block 1080). An example status delivery command 1040 is shown in FIG. 10. The example status delivery command 1040 allows an authorized conference call participant to schedule and communicate an obligation to provide a project status update or similar information, at some future date. If the speaker recited "status delivery" during the conference call (and the speaker was determined to be authorized to invoke this command), or if the participant typed in the command "status delivery" via the input device 350, then program control advances from block 1000 to block 1040. Without limitation, the participant may select a button or soft-key associated with the command "status delivery," thereby allowing the participant to invoke the command in at least four ways. That is, the participant may speak the command, type the command, press a button associated with the command, or select a soft-key associated with the command. The voice command server 425 prompts the conference call participants for the name of the status delivery owner, (e.g., the person held responsible for delivering the status update) (block 1042). For example, the voice command server 425 of the illustrated example plays a recorded message to the conference call participants that recites the phrase, "Please speak the name of the status delivery owner." As discussed above, such instructions may, additionally or alternatively, be presented to the participant on the display 360. Responses received by the voice command server 425 made by the speaker are converted to text by a speech-to-text engine included in, or operatively connected to, the voice command server 425. The text generated by the speech-to-text converter is representative of what conference call participants say and is saved to the conference log database 440 via the conference log server 435. Accordingly, the name of the status delivery owner is saved to the conference log database 440 for further review by, for example, the meeting facilitator when the conference call ends.

The voice command server 425 of the illustrated example also plays and/or displays a message to the conference call participants requesting a due date for the status update (block 1044). For example, the voice command server 425 may play (or display) a message that recites, "Please speak the month, day, and year for which this status update will be provided." The response(s) are recorded.

Information regarding the information that will be disclosed ("narrative") during the status update is then requested by the example system 100 of FIG. 1 (block 1046). In particular, the voice command server 425 of the illustrated example plays a message, and/or causes a text message to be displayed to the conference participants that recites/reads, for example, "Please describe the agenda and/or topics for which the status update is desired. Press the pound-key when you are finished." The words spoken and/or typed by the conference participants are then converted from speech-to-text (if spoken) and saved to the conference log database 440.

Upon completion of the narrative at block 1046, the example program of FIG. 10 advances to block 1048 in which a flag is set to notify conference call participants of the new status update date. For example, upon completion of the conference call, the meeting facilitator may review the conference log, which includes all commands that were invoiced during the conference. The meeting facilitator may either approve in full, approve in part, or deny the flag that notifies the conference call participants of the status update. If the meeting facilitator approves, then some or all of the conference call participants and/or one or more designated persons that did not participate in the call will receive notification of the status update. As discussed above, notification may include e-mail and/or adding the status update to the electronic calendars of the conference call participants.

An example "schedule meeting" command 1060 is shown in FIG. 10. The example schedule meeting command 1060 allows an authorized conference call participant to schedule a meeting for a future date. If the speaker recited or typed "schedule meeting" during the conference call (and the participant was determined to be authorized to invoke this command) then program control advances from block 1060 to block 1062. The voice command server 425 prompts the conference call participants for the name of the party responsible for the meeting, (e.g., the person to serve as meeting facilitator) (block 1062). For example, the voice command server 425 of the illustrated example plays a recorded message to the conference call participants that recites the phrase, "Please speak the name of the meeting owner." Similarly, such messages may be textually displayed to the participant via the display 360 of the example VoIP phone 205. Responses received by the voice command server 425 made by the speaker/typer are converted to text (if spoken) by a speech-to-text engine included in, or operatively connected to, the voice command server 425. The text generated by the speech-to-text converter is representative of what conference call participants say and is saved to the conference log database 440 via the conference log server 435. Accordingly, the name of the scheduled meeting owner is saved to the conference log database 440 for further review by, for example, the meeting facilitator when the conference call ends.

The voice command server 425 of the illustrated example also plays and/or displays a message to the conference call participants requesting a meeting date for the scheduled meeting (block 1064). For example, the voice command server 425 may present a message that recites, "Please speak or type the month, day, and year for which this meeting will be held." The response(s) are recorded.

A prompt for required and/or desired meeting participants is issued by the voice command server 425 of the illustrated example (block 1066). For example, the voice command server 425 of the illustrated example presents a message to the conference call participants that recites, "Please speak or type the names of required or desired attendees for this meeting." The names recited are converted from speech-to-text (if spoken) and saved to the conference log database.

Information regarding the information that will be discussed and/or the meeting objectives ("narrative") during the scheduled meeting are then requested by the example system 100 of FIG. 1 (block 1068). In particular, the voice command server 425 of the illustrated example presents a message to the conference participants that recites, for example, "Please describe the agenda and/or topics the meeting will address. Press the pound-key when you are finished." The words spoken or typed by the conference participants are then converted from speech-to-text (if spoken) and saved to the conference log database 440.

Upon completion of the narrative at block 106S, the example program of FIG. 10 advances to block 1070 in which a flag is set to notify conference call participants of the new meeting date. For example, upon completion of the conference call, the meeting facilitator may review the conference log, which includes all commands that were invoked (either by speech or input via the example VoIP phone 205) during the conference. The meeting facilitator may either approve in full, approve in part, or deny the flag that notifies the conference call participants of the meeting. If the meeting facilitator approves, then some or all of the conference call participants and/or one or more designated persons that did not participate in the call will receive notification of the meeting. As discussed above, notification may include e-mail and/or adding the meeting to the electronic calendars of the conference call participants.

An authorized participant may also invoke a "record meeting" command (block 1072) to record the dialog spoken by various meeting participants during the conference call. For example, upon the authorized participant invoking the "record meeting" command, the voice command server 425 prompts the conference call participants (e.g., via a text message presented on the display 360) for the person that is to receive the recorded minutes. Alternatively, the voice command server 425 may automatically determine the speaker's identity by sending the spoken command to the voiceprint server 415 (block 1074). As such, the voiceprint server 415 may append the name of each speaker to the transcript next to the speaker's text. Without limitation, the speaker's identity may be determined by way of identifying the participant's IP address. The voice command server 425 records words spoken by the various speakers and converts the voice information to text prior to storing the text data in the voice command database 430. Alternatively or additionally, the voice data may be stored in an audio format that includes, but is not limited to, audio video interleave (AVI), WAVE (WAV) format by Microsoft®, audio interchange file format (AIFF), Windows® media audio (WMA), and/or MPEG audio layer-3 (MP3) format. Storing the meeting minutes to the database in an audio format, rather than immediately converting voice-to-text, allows the system 100 to conserve computer processing resources for off-peak times. Alternatively or additionally, the meeting facilitator may choose to receive both a transcript (e.g., log) of the meeting in text as well as the audio for subsequent review. Such transcript log(s) and/or audio files (e.g., MP3 files) may be e-mailed to the meeting facilitator after the conference ends (block 1076). Of course, one or more fees may be charged for any of the services of the conference call manager 105 including fees for creating logs, for storing logs, for emailing or otherwise communicating logs, etc.

Figure 11:
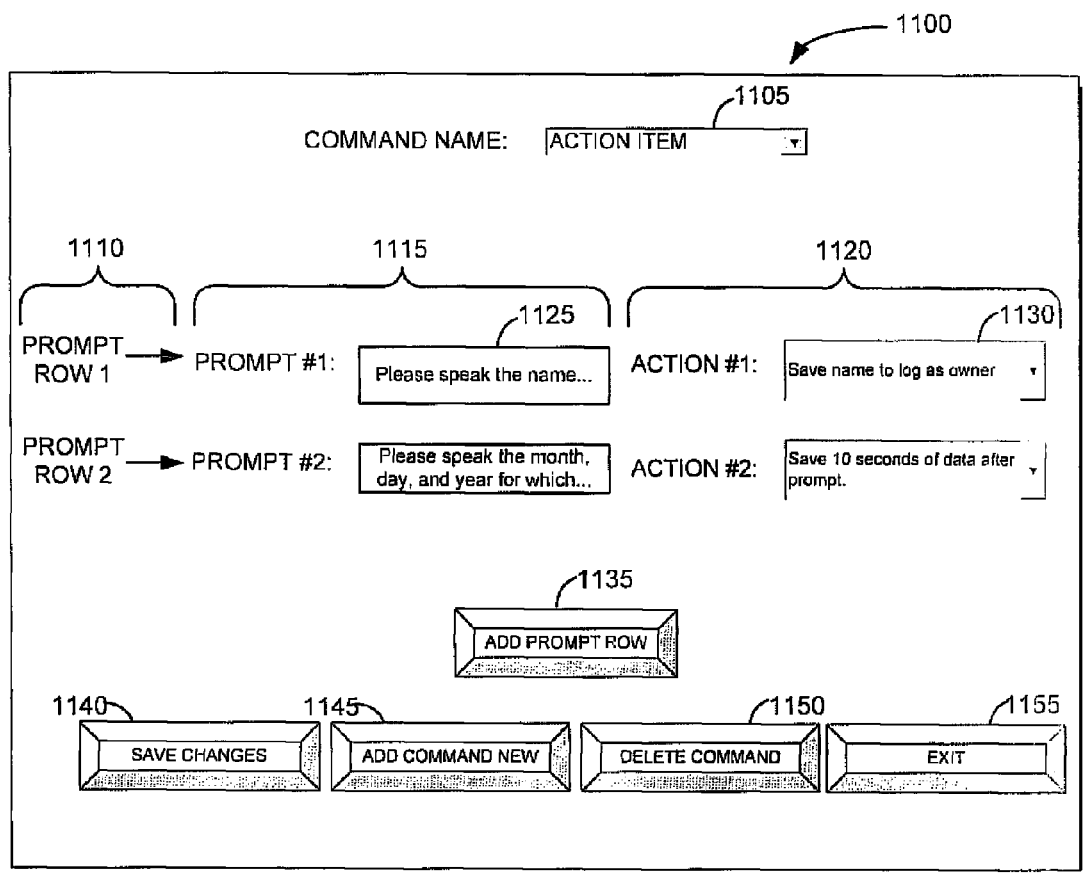
FIG. 11 illustrates an example user interface which may be displayed to a user of the example system of FIG. 1.

FIG. 11 is an example graphical user interface (GUI) 1100 displayed by the example voice command server 425 of FIG. 4. When an authorized user (e.g., a technician associated with a telecommunication company, a conferencing technical assistant, a meeting facilitator, etc.) accesses the GUI 1100, any of the existing commands and corresponding instructions maybe edited, enabled, disabled, and/or deleted. Additionally, the GUI 1100 provides the authorized user an option to create new commands, as needed.

The example GUI 1100 of FIG. 11 includes a command name drop down menu 1105 to provide the user with a list of commands to which the system 100 may respond. If the user selects a command within the drop down menu 1105, then the corresponding instructions are populated in the various fields of the GUI 1100, as discussed below. Depending on the number of interactive system prompts required by the selected command, the GUI 1100 displays a corresponding prompt row 1110. Each prompt row 1110 includes a prompt field 1115 and an action field 1120. The prompt fields display language that the system 100 will recite to the conference call participants after the command is invoked. For example, the first prompt for the "action item" command 1020, as discussed above in view of FIG. 10, causes the system 100 to play the phrase "Please speak the name of the action item owner," shown in a field for prompt #1 (1125). As shown in the example GUI 1100 of FIG. 11, because the "action item" command is selected in the command name drop down menu 1105, all of the prompts and corresponding actions (instructions) appear below and relate to the "action item" command. The corresponding action #1 (1130) instructs the system 100 to save the name recited by a conference call participant to the log.

If the user chooses to edit the displayed command (e.g., the "action item" command), then the user may select any field and type-in or select changes. For example, the user may select an "add prompt row" button 1135 to add more instructions to the command, and/or delete the contents of existing prompt row information to remove command instructions. Upon completion of any changes, the user may select a "save changes" button 1140. Additionally, if the user has entered a new command name in the command name drop down menu 1105 and entered corresponding prompts and actions, then the user may select an "Add Command New" button 1145 to add the command to the list of commands to which the system 100 will respond. Still further, the user may delete any selected command by selecting a "Delete Command" button 1150. If the user selects an "Exit" button 1155, then the example GUI 1100 exits without making any changes to the selected command.

Figure 12:
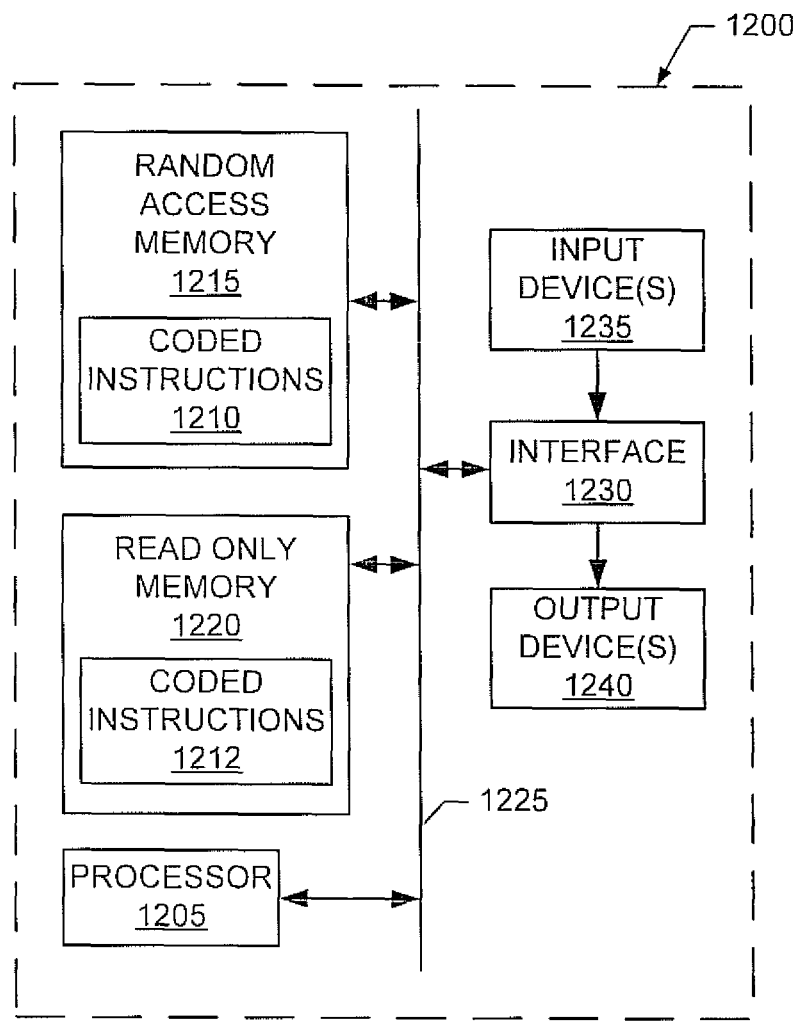
FIG. 12 is a schematic illustration of an example computer which may execute the programs of FIGS. 8-10 to implement the example system to manage conference call activity of FIG. 1.

FIG. 12 is a schematic diagram of an example processor platform 1200 that may be used and/or programmed to execute some or all of the instructions represented by FIGS. 8-10 to implement all or a portion of the example VoIP devices 120, the conference call manager 105, and/or the VoIP processor 110 of FIGS. 1-4. For example, the processor platform 1200 can be implemented by one or more general purpose processors, processor cores, microcontrollers, etc.

The processor platform 1200 of the example of FIG. 12 includes at least one general purpose programmable processor 1205. The processor 1205 executes coded instructions 1210 and/or 1212 present in main memory of the processor 1205 (e.g., within a RAM. 1215 and/or a ROM 1220). The processor 1205 maybe any type of processing unit, such as a processor core, a processor and/or a microcontroller. The processor 1205 may execute, among other things, the example machine accessible instructions of FIGS. 8-10 to provide conference call service in a VoIP communication network. The processor 1205 is in communication with the main memory (including a ROM 1220 and/or the RAM 1215) via a bus 1225. The RAM 1215 may be implemented by DRAM, SDRAM, and/or any other type of RAM device, and ROM may be implemented by flash memory and/or any other desired type of memory device. Access to the memory 1215 and 1220 maybe controlled by a memory controller (not shown). The processor platform 1200 also includes an interface circuit 1230. The interface circuit 1230 may be implemented by any type of interface standard, such as an external memory interface, serial port, general purpose input/output, etc. One or more input devices 1235 and one or more output devices 1240 are connected to the interface circuit 1230.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
monitoring a network for a first conference call participant connection request;
prompting a first conference call participant for voice credentials;
invoking a voice print server to authenticate the voice credentials of the first conference call participant;
excluding the first conference call participant when the voice credentials are not authenticated by the voice print server;
when the voice credentials of the first conference call participant are authenticated by the voice print server:
authorizing an Internet protocol address to serve as a substitute for the voice credentials during a subsequent request; and assigning a level of access to the Internet protocol address based on an identity of the first conference call participant; and receiving the subsequent request that includes an action item voice command from the authorized first conference call participant;

during the subsequent request:
bypassing the voice print server if the Internet protocol address associated with the first conference call participant is authorized to serve as the substitute for the voice credentials; and allowing the subsequent request if the level of access assigned to the Internet protocol address satisfies an access requirement of the subsequent request; and sending an identity of the authorized first conference call participant to a second authorized conference call participant for display on a voice over Internet protocol enabled device.

2. A method as defined in claim 1, wherein the first conference call participant connection request is made via a voice over Internet protocol phone.

3. A method as defined in claim 1, further including comparing the Internet protocol address to a lookup table to determine if the first conference call participant is authorized.

4. A method as defined in claim 1, wherein the voice credentials include an audio signal representative of a voice signature stored in a memory of a voice over Internet protocol enabled device.

5. A method as defined in claim 4, further including comparing the audio signal to a database to determine if the first conference call participant is authorized.

6. An apparatus comprising:
a processor; and
a memory including machine readable instructions that, when executed by the processor, cause the processor to perform operations to:
monitor a network for a first conference call participant connection request;
prompt a first conference call participant for voice credentials;
invoke a voice print server to authenticate the voice credentials of the first conference call participant;
exclude the first conference call participant when the voice credentials are not authenticated by the voice print server;
when the voice credentials of the first conference call participant are authenticated by the voice print server:
authorize an Internet protocol address to serve as a substitute for the voice credentials during a subsequent request; and
assign a level of access to the Internet protocol address based on an identity of the first conference call participant;
receive the subsequent request that includes an action item voice command from the authorized first conference call participant;
during the subsequent request:
bypass the voice print server if the Internet protocol address associated with the first conference call participant is authorized to serve as the substitute for the voice credentials; and
allow the subsequent request if the level of access assigned to the Internet protocol address satisfies an access requirement of the subsequent request; and
send an identity of the authorized first conference call participant to a second authorized conference call participant for display on a voice over Internet protocol enabled device.

7. An apparatus as defined in claim 6, wherein the first conference call participant connection request is from a WiFi Internet protocol phone.

8. An apparatus as defined in claim 6, wherein the instructions, when executed by the processor, cause the processor to perform operations to compare the Internet protocol address to a lookup table to determine if the first conference call participant is authorized.

9. An apparatus as defined in claim 6, wherein the voice credentials include an audio signal representative of the first conference call participant reciting a phrase.

10. An apparatus as defined in claim 9, wherein the instructions, when executed by the processor, cause the processor to perform operations to compare the audio signal to a database to determine if the first conference call participant is authorized.

11. A tangible machine readable storage device comprising instructions that, when executed, cause a machine to perform operations to:
monitor a network for a first conference call participant connection request;
prompt a first conference call participant for voice credentials;
invoke a voice print server to authenticate the voice credentials of the first conference call participant;
exclude the first conference call participant when the voice credentials are not authenticated by the voice print server;
when the voice credentials of the first conference call participant are authenticated by the voice print server:
authorize an Internet protocol address to serve as a substitute for the voice credentials during a subsequent request; and
assign a level of access to the Internet protocol address based on an identity of the first conference call participant;
receive the subsequent request that includes an action item voice command from the authorized first conference call participant;
during the subsequent request:
bypass the voice print server if the Internet protocol address associated with the first conference call participant is authorized to serve as the substitute for the voice credentials; and
allow the subsequent request if the level of access assigned to the Internet protocol address satisfies an access requirement of the subsequent request; and
send an identity of the authorized first conference call participant to a second authorized conference call participant for display on a voice over Internet protocol enabled device.

12. A tangible machine readable storage device as defined in claim 11, wherein the first conference call participant connection request is from a voice over Internet protocol gateway.

13. A tangible machine readable storage device as defined in claim 11, wherein the instructions, when executed, cause the machine to perform operations to compare the Internet protocol address to a lookup table to determine if the first conference call participant is authorized.

14. A tangible machine readable storage device as defined in claim 11, wherein the voice credentials include a voice signature stored in a memory of a voice over Internet protocol enabled device.

15. A tangible machine readable storage device as defined in claim 14, wherein the instructions, when executed, cause the machine to perform operations to compare the audio signal to a database to determine if the first conference call participant is authorized.

* * * * *